United States Patent
Erb et al.

(10) Patent No.: US 12,459,870 B2
(45) Date of Patent: Nov. 4, 2025

(54) THERMALLY CONDUCTIVE BORON NITRIDE FILMS AND MULTILAYERED COMPOSITES CONTAINING THEM

(71) Applicant: Northeastern University, Boston, MA (US)

(72) Inventors: Randall Erb, Newton, MA (US);
Jessica Faust, Tyngsboro, MA (US);
Evan Toth, North Kingstown, RI (US)

(73) Assignee: Northeastern University, Boston, MA (US)

( * ) Notice: Subject to any disclaimer, the term of this patent is extended or adjusted under 35 U.S.C. 154(b) by 0 days.

(21) Appl. No.: 17/631,670

(22) PCT Filed: Jul. 31, 2020

(86) PCT No.: PCT/US2020/044667
§ 371 (c)(1),
(2) Date: Jan. 31, 2022

(87) PCT Pub. No.: WO2021/034490
PCT Pub. Date: Feb. 25, 2021

(65) Prior Publication Data
US 2022/0274887 A1    Sep. 1, 2022

Related U.S. Application Data

(60) Provisional application No. 62/880,699, filed on Jul. 31, 2019, provisional application No. 62/936,877, filed on Nov. 18, 2019.

(51) Int. Cl.
*C04B 35/583* (2006.01)
*B32B 5/02* (2006.01)
(Continued)

(52) U.S. Cl.
CPC ............ *C04B 35/583* (2013.01); *B32B 5/024* (2013.01); *B32B 5/262* (2021.05); *B32B 7/12* (2013.01);
(Continued)

(58) Field of Classification Search
CPC ................................ C04B 35/583; B32B 5/12
See application file for complete search history.

(56) References Cited

U.S. PATENT DOCUMENTS 7,439,475 B2 * 10/2008 Ohta ................... H01L 23/373
257/E23.09
2002/0123285 A1   9/2002 Dana et al.
(Continued)

FOREIGN PATENT DOCUMENTS

CN    205929651 U     2/2017
EP    3522689 A1 *    8/2019 ............... C09K 5/14
(Continued)

OTHER PUBLICATIONS

Emelyanenko, A.; Boinovich, L.; Bezdomnikov, A.; Chulkova, E.; Emelyanenko, K.; "Reinforced Superhydrophobic Coating on Silicone Rubber for Longstanding Anti-Icing Performance in Severe Conditions"; ACS Applied Materials & Interfaces, 2017, 9, p. 24210-24219.*

(Continued)

*Primary Examiner* — Humera N. Sheikh
*Assistant Examiner* — Julia L Rummel
(74) *Attorney, Agent, or Firm* — Verrill Dana, LLP

(57) ABSTRACT

Composite multilayered material compositions are provided which contain one or more hexagonal boron nitride (hBN)-containing layers, together with layers comprising optional polymeric binders, glass fibers, magneto-ceramic materials, and a super-hydrophobic outer coating. Methods are provided for making the composite materials and products (Continued)

containing them. The composite materials are useful for making radomes and other coverings for electronic components and equipment.

12 Claims, 14 Drawing Sheets

(51) Int. Cl.
    *B32B 5/26*     (2006.01)
    *B32B 7/12*     (2006.01)
    *B32B 15/14*     (2006.01)
    *B32B 15/18*     (2006.01)
    *C04B 35/622*     (2006.01)
    *C09K 5/14*     (2006.01)
    *B32B 5/12*     (2006.01)
    *B32B 7/027*     (2019.01)

(52) U.S. Cl.
CPC .............. *B32B 15/14* (2013.01); *B32B 15/18* (2013.01); *C04B 35/62218* (2013.01); *C09K 5/14* (2013.01); *B32B 5/12* (2013.01); *B32B 7/027* (2019.01); *B32B 2255/06* (2013.01); *B32B 2255/26* (2013.01); *B32B 2260/021* (2013.01); *B32B 2260/046* (2013.01); *B32B 2262/101* (2013.01); *B32B 2307/30* (2013.01); *B32B 2307/73* (2013.01); *C04B 2235/5292* (2013.01)

(56) References Cited

U.S. PATENT DOCUMENTS

| | | | | |
|---|---|---|---|---|
| 2008/0166563 A1* | 7/2008 | Brittingham | ............... | C08J 3/18 219/202 |
| 2014/0327335 A1 | 11/2014 | Mabuchi et al. | | |
| 2015/0022423 A1* | 1/2015 | Johnson | ................ | B29C 66/636 156/217 |
| 2015/0284295 A1 | 10/2015 | Magdefrau et al. | | |
| 2016/0114883 A1* | 4/2016 | Guerry | .................. | B08B 17/065 428/141 |
| 2018/0222146 A1* | 8/2018 | Rice | .......... | B32B 5/10 |
| 2019/0077718 A1 | 3/2019 | Garnier | | |
| 2019/0104612 A1 | 4/2019 | Amla | | |

FOREIGN PATENT DOCUMENTS

| | | |
|---|---|---|
| WO | 2007089230 A2 | 8/2007 |
| WO | 2015178416 A1 | 11/2015 |
| WO | 2016049477 A1 | 3/2016 |
| WO | 2018061447 A1 | 5/2018 |

OTHER PUBLICATIONS

Isola Comosite, "What are the Differences Between Glass Mat and Glass Cloth", 2022, p. 1-5; https://www.isolacomposite.com/make-the-most-of-the-season-by-following-these-simple-guidelines.*

Anjana et al., "Low Dielectric Loss PTFE/CeO2 Ceramic Composites for Microwave Substrate Applications", Int'l Journal of Applied Ceramic Technology, 5 [4] pp. 325-333 (2008).

Pachchigar et al., "Role of Hierarchical Protrusions in Water Repellent Superhydrophobic PTFE Surface Produced by Low Energy Ion Beam Irradiation", Scientific Reports, 9:8675 (2019), 10 pages.

ChemSec Marketplace, "Binders for Nowovens and Textiles", {retrieved from internet on Jan. 18, 2021 (Jan. 18, 2021) marketplace.chemsec.org/Alternative/BINDERS-FOR-NONWOVENS-AND-TEXTILES-7#:-:text=Binders%20are%20used%20to%20improve,be%20entirely%20from%20renewable%20cellulose., 2 pages.

* cited by examiner

Fibreglast System 2000 Laminating Epoxy Resin

Layer fiberglass of different weights to tailor mechanical strength and surface roughness Voids form 151.8°  117.4°

THERMALLY CONDUCTIVE BORON NITRIDE FILMS AND MULTILAYERED COMPOSITES CONTAINING THEM

CROSS-REFERENCE TO RELATED APPLICATIONS

This application claims priority to U.S. Provisional Application No. 62/880,699, filed 31 Jul. 2019, the entirety of which is incorporated herein by reference, and this application claims priority to U.S. Provisional Application No. 62/936,877, filed 18 Nov. 2019, the entirety of which is incorporated herein by reference.

BACKGROUND

Radomes contain and protect electronic installations such as radar from wind, moisture, and visibility. In some cases, radomes are also required to dissipate heat, such when used as nosecones for flight. In all cases, radomes must provide both transparency and low reflectivity for radio frequency signals. Ideally, a radome is constructed of a material that minimally attenuates transmitted or received electromagnetic radiation while filtering or attenuating undesired signals, and yet is mechanically robust and water shedding. Radomes are typically constructed of composite materials designed to perform these functions. As the demand grows for sophisticated electronics used in aviation, defense, space travel, and wireless transmissions, there is a need for materials for constructing radomes and other coverings for electronic components and installations offering superior bandpass tunability, thermal dissipation, and mechanical robustness.

SUMMARY

The present technology provides coatings and composite materials containing hexagonal boron nitride for high performance thermal conductivity and use in radomes and other tunable coverings for electronic components and equipment. The composite materials dissipate heat and infrared radiation while providing tunable radio frequency (RF). The materials can include a superhydrophobic coating to limit RF attenuation and distortion caused by rain or other forms of moisture. The technology also provide methods for producing such composites over a range of thickness from less than about 1 micron (as little as a single monolayer of hexagonal boron nitride) up to over a centimeter. Quarter wavelength, twelfth wavelength, or any selected design thicknesses can be integrated within layers to provide bandpass or directional transmission features.

As used herein, the term "platelet" refers to a flat particle having a small dimension on the Z-axis and larger dimensions on the X-axis and Y-axis. The thinnest platelets of hexagonal boron nitride (hBN) are a single atomic layer thick 2D material having a Z-axis of about 0.4-0.5 nm and the size of the larger diameters (X,Y) typically depending upon the method of production. A process of exfoliation can separate multilayers of hBN into fewer or into single layers. Platelets of 2-layer and 3-layer hexagonal boron nitride have thicknesses of about 0.7-0.9 nm and 1.1-1.3 nm, respectively. The smaller platelets of hexagonal boron nitride are known as graphitic or white graphite. The stacked 2D layers in hBN are held together by van der Waals forces. Exfoliation of thicker platelets into thinner platelets can be accomplished by, for example, higher energy sonication (e.g., probe-tip or high amplitude bath), ball milling, chemical, or gas exfoliation. In most methods of exfoliation, the diameter (X,Y) of the platelets is also lowered during exfoliation. Some methods of synthesis for monolayer, 2-layer, and 3-layer hBN can provide larger X,Y dimensions.

Examples of hexagonal boron nitride platelets utilized in the present technology have a mean particle size from about 5 microns to about 100 microns, from about 5 microns to about 50 microns, or from about 5 microns to about 45 microns. As used herein, the term mean particle size can refer to average or median diameter, with the Z-axis from the minimum (discussed above) to about 5 microns, to about 10 microns, to about 20 microns, to about 40 microns, or to about 50 microns.

As used herein, the term mean particle size and average particle size can refer to a mean or median particle size (D50) calculated utilizing particles' number, volume, weight, surface area, or intensity to weight the distribution. Typically, particle sizes measured using laser diffraction generate results based on median or mean volume based distributions. Different particle size instruments can provide different average particle size measurements because of detection methods or calculations of particle size, shape factor, aspect ratio, and varying distributions utilized to calculate the average. Different particle size measurement instruments can use different particle detection and distribution methods; for example, laser diffraction, static or dynamic light scattering, image analysis, gas surface area, mesh, or sieve. The mean or median particle size can be reported as the D50, which refers to the size (in microns) that splits the distribution with half of the distribution above and half below this number. The D10 is the size at which 10% of the distribution is below that size. The D90 is the size at which 90% of the distribution is below that size.

Hexagonal boron nitride particles can be provide increased thermal conductivity to resin systems. Hexagonal boron nitride (hBN) platelets can have very high thermal conductivities with the long-axes (X,Y) of the crystal exhibiting ~300-600 W/mK and the short-axis (Z) exhibiting ~20-40 W/mK. Further, hBN is a dielectric material.

As used herein, a superhydrophobic layer, a CFz-E layer, and a CFz layer is a z-aligned fiber outer layer that exhibits super-hydrophobicity and durability. A superhydrophobic layer can be a self-similar material, which is defined as one that wears evenly and its hydrophobic properties do not change as it wears. The fibers can be carbon fibers or other fibers such as hollow polymeric fibers. Superhydrophobic surfaces are highly hydrophobic, (i.e., extremely difficult to wet). The contact angles of a water droplet on a new superhydrophobic material can be greater than about 100-110°, such as greater than 140-150°.

As used herein, a surfactant or detergent can be ionic or non-ionic.

The present technology can be provided as a kit including particles or platelets of hexagonal boron nitride, optionally solvent, and optionally adhesive(s), along with instructions for use to form multilayered composite materials described herein.

As used herein, the term "about" can include values within 10%, 5%, 1%, or 0.5% of the stated value.

The technology can be further summarized in the following list of features.

1. A layered composite material comprising:
   i) a hexagonal boron nitride thermally conducting layer;
   ii) an optional core layer;
   iii) a fiber reinforced layer; and
   iv) a hydrophobic layer.

2. The layered composite material of feature 1, comprising said core layer, wherein the core layer comprises air, a foam, a honeycomb, a ferrite material, a magneto-ceramic material, a metal, a polymeric material, a fibrous material, or a combination thereof.

3. The layered composite material of feature 2, wherein the core layer comprises polystyrene, polyethylene, PVC foam, polyurethane foam, polycarbonate honeycomb, honeycomb paper, synthetic fiber, wood, carbon fiber, or a combination thereof.

4. The layered composite material of any of the preceding features, wherein the fiber reinforced layer comprises a synthetic fiber, glass fiber, quartz fiber, carbon fiber, or a combination thereof.

5. The layered composite material of any of the preceding features, wherein the hydrophobic layer comprises a low-loss superhydrophobic material comprising a z-aligned fiber outer layer and/or fibers coated with polytetrafluoroethylene.

6. The layered composite material of any of the preceding features, wherein said hydrophobic layer is disposed at a surface of the composite material.

7. The layered composite material of any of the preceding features, wherein said hexagonal boron nitride layer is disposed at a surface of the composite material.

8. The layered composite material of any of the preceding features, wherein the boron nitride layer comprises or consists of one or more layers of hexagonal boron nitride platelets.

9. The layered composite material of any of the preceding features, wherein the fiber reinforced layer comprises one or more woven glass fiber fabrics embedded in a binder.

10. The layered composite material of feature 9, wherein the binder is an epoxy.

11. The layered composite material of any of the preceding features, comprising a hexaferrite core, fiberglass layers bound to opposite surfaces of the hexaferrite core, a hexagonal boron nitride layer disposed at a first surface of the composite material and bound to one of said fiberglass layers, and a superhydrophobic disposed at a second surface of the composite material opposite the first surface.

12. The layered composite material of any of the preceding features, wherein the material is configured as a radome, a radio frequency filter, a covering for an electronic component or device, or a portion thereof.

13. A product comprising the layered composite material of any of features 1-11.

14. The product of feature 13, wherein the product is selected from the group consisting of a radome, a nosecone, a circuit board shield, a heat shield for an electronic device, a battery package, an aerodynamic heat shield, a satellite heat shield, a cellular network antenna heat shield, an engine heat shield, an exhaust heat shield, a band-pass filter, a CPU or GPU heatsink, a building material, and a thermal soak heat shield.

15. A process for fabricating a thermally conductive coating on a substrate, the process comprising:
 (a) forming a layer comprising hexagonal boron nitride platelets at a liquid-gas interface, and
 (b) passing the substrate through the liquid-gas interface, whereby a plurality of the hexagonal boron nitride platelets is deposited onto a surface of the substrate.

16. The process of feature 15, wherein a monolayer or a multilayer of the hexagonal boron nitride platelets is deposited onto the surface of the substrate.

17. The process of feature 15 or 16, wherein the hexagonal boron nitride platelets have an average diameter in the range from about 5 microns to about 50 microns.

18. The process of any of features 15-17, further comprising:
 (c) fixing the deposited hexagonal boron nitride platelets to the surface of the substrate by a process comprising heating, application of a binder or adhesive, vacuum molding, compression curing, shrink wrap molding, autoclaving, evaporation of a residual liquid, or a combination thereof.

19. The process of any of features 15-18, wherein the surface of the substrate is coated with an adhesive prior to passing the substrate through the liquid-gas interface.

20. The process of feature 19, wherein the adhesive comprises an epoxy resin, a cyanate resin, a polyester resin, a polyimide resin, an organic silicone resin, a polytetrafluoroethylene resin, a cyanoacrylate, a bimaleimide resin, a polyether ether ketone resin, a phenolic resin, a polyethylene resin, or any combination thereof.

21. The process of any of features 15-20, wherein the liquid comprises a surfactant.

22. The process of any of features 15-21, comprising applying heat and spraying the thermally conductive coating with an epoxy binder.

23. A process for fabricating a hydrophobic composite material, the process comprising:
 (a) forming a first slurry comprising an adhesive, a filler comprising a plurality of hexagonal boron nitride platelets, and optionally a solvent;
 (b) contacting a hydrophobic material with the first slurry; and
 (c) drying the adhesive or evaporating at least a portion of the solvent, whereby a portion of the adhesive penetrates into the hydrophobic layer.

24. The process of feature 23, wherein step (c) comprises vacuum molding, compression curing, shrink wrap molding, autoclaving, heat, or a combination thereof.

25. A process for fabricating a multilayered composite, the process comprising:
 (a) depositing a first and optionally a second fiberglass layer on surfaces of a core material layer;
 (b) depositing a hexagonal boron nitride layer on said first fiberglass layer; and
 (c) depositing a hydrophobic layer on the second fiberglass layer, or on a surface of the core material layer if no second fiberglass layer was deposited in (a);
 thereby fabricating the multilayered composite.

26. The process of feature 25, wherein the core layer comprises air, a foam, a honeycomb, a ferrite material, a magneto-ceramic material, a metal, a polymeric material, a fibrous material, or a combination thereof.

27. The process of feature 25 or 26, wherein the hydrophobic layer comprises fibers coated with polytetrafluoroethylene.

28. The process of any of features 25-27, further comprising applying an adhesive or binder to the fiberglass layer and or the hydrophobic layer.

29. The process of feature 28, wherein the adhesive or binder comprises an epoxy resin, a cyanate resin, a polyester resin, a polyimide resin, an organic silicone resin, a polytetrafluoroethylene resin, a cyanoacrylate, a bimaleimide resin, a polyether ether ketone resin, a phenolic resin, a polyethylene resin, or a combination thereof.

30. The process of any of features 25-29, further comprising applying an additional hydrophobic coating over the hydrophobic layer, the additional hydrophobic coating comprising polytetrafluoroethylene, silica, silicone acrylic copolymer, organic or inorganic polysiloxane, manganese oxide polystyrene, zinc oxide polystyrene, calcium carbonate, carbon nanotubes, carbon fibers, fluorinated silane, fluoropolymer, or a combination thereof.

31. The process of any of features 25-30, wherein step (b) comprises forming a Langmuir-Blodgett film comprising said hexagonal boron nitride platelets and dip-coating the product of step (a) with the Langmuir-Blodgett film.

DETAILED DESCRIPTION

Figure 1A:
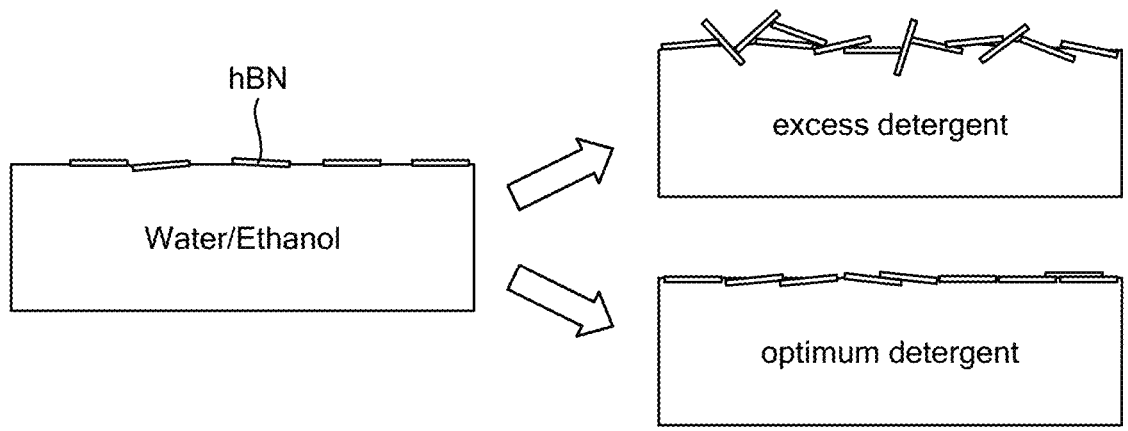
FIG. 1A shows a schematic illustration of the effect of detergent concentration on a Langmuir Blodgett film of hBN platelets.

The present technology provides composite layered material compositions having one or more hexagonal boron nitride (hBN)-containing layers or films, together with layers comprising optional polymeric binders, glass fibers, magneto-ceramic materials, and a superhydrophobic outer coating. The technology also provides methods for making the composite materials and products containing them. The composite materials are useful for making radomes and other coverings for electronic components and equipment, for example. On such method is a Langmuir-Blodgett technique for coating surface of products with layers of boron nitride (BN) in thicknesses ranging from monolayers less than 1 μm to multilayers of up to at least 1 cm for creating a highly efficient thermally conductive coating on any product or device surface.

The thermally conductive hexagonal boron nitride (hBN) films or layers can have a variety of applications and can improve upon existing thermal coatings due to the high in-plane or basal-plane thermal conductivity of hBN. In the specific example of fiberglass-epoxy (FG-epoxy) composites without hBN, poor thermal conductivity leads to localized hot spots in the material when used as a covering for electrical equipment, causing mechanical and electrical degradation. The present inventors have Introduced a thin monolayer of hBN, preferably in the form of hBN platelets, at a surface of a composite, which can allow heat to spread laterally without impacting the material properties and also extending the longevity of the material. The reduction of hot spots in a radome material, for example, can reduce RF distortion and improve signal and special resolution, as well as improve signal to noise ratio, material longevity, and protection of enclosed equipment. The hBN platelets have very high thermal conductivities along the basal-plane axes (X,Y) of the crystal, e.g., ~300-600 W/mK, and along the through plane or short axis (Z), e.g., ~20-40 W/mK. The hBN platelets provide RF transparency or translucency in the through plane and can be combined with A-sandwich, C-sandwich, or other band-pass layer structures. The thermal management technologies described herein provide simple, less expensive solutions to thermal management applications that can be active, energy intensive, and complex.

The creation of thermal dispersion layers (thermal spreaders) based on hBN can be achieved in many architectures from single and multiple layers of percolated hBN monolayers to thicker films. The thickness of these thermal spreaders can range from about less than 1 micron in the case of the hBN monolayers and about 50 microns to about 5 millimeters or 1 cm or more for thicker films.

The fabrication techniques can include i) the creation of single and multiple layers of percolated hBN particles on the surface of other materials to serve as a thermal spreading layer to dissipate heat build-up and ii) a sandwich structure that combines, for example, glass-fiber reinforced polymers (GFRP) and hBN filled epoxy or polymer to create thermally conductive hBN-GFRP hybrid materials. In the first process, the single or multiple layers of percolated hBN particles are applied to any component of any material and geometry by using a Langmuir-Blodgett method provided the epoxy or adhesive binder adheres well and the material can withstand short exposure to water, solvent, or mixtures of water and solvent.

The fabrication methods can use a vacuum molding process to laminate the thermal spreading to various substrates, providing excellent flexibility in the desired final product. The effectiveness of thermal spreaders is investigated with hBN particles herein, specifically platelets of varied diameters (diameter referring to the largest linear measure from one end to another in the platelet basal plane).

In general, higher thermal conductivities were obtained using larger diameter hBN particles or platelets.

To produce thermal spreading architectures that have single and multiple hBN monolayers, one-step and two-step Langmuir-Blodgett (L-B) film processes can be used. Both the one-step and two-step methods can be used to apply extremely thin (<1 μm) hBN films to components. Additional steps can be used to apply additional functionality to films or layers, to provide additional films or layers, or to provide custom products. The thin layers of hBN can be advantageous in certain applications especially involving electromagnetic or optical transmission.

In a one-step L-B film process, hBN platelets can be self-assembled on the surface (i.e., interface with air or another gas) of water, solvent, or liquid mixture (e.g., water-solvent, such as water-alcohol or water together with a water-miscible organic solvent) using surface tension. Percolation can then be achieved using the Marangoni Effect by adding surfactant to the L-B film, which drives the hBN platelets into a fully percolated state. A component or substrate is then carefully dip coated through the L-B film to directly transfer the percolated monolayer of the hBN platelets onto the surface of the component or to a surface of the substrate. One-step L-B film processes can be implemented to directly coat components with varied topography with a single monolayer of percolated hBN particles. These particles can be fixated in some manner, for example by spray coating of a binder or adhesive. Fixation can allow a second or multiple additional monolayers to be added. Fixation can involve evaporation of residual solvent from the layer on the component or substrate by applying heat or vacuum, or evaporation can be separate from fixation. For example, heat can be applied at about 30° C., about 40° C., about 50° C., about 60° C., about 70° C., about 80° C., about 90° C., or higher depending on the composition of the substrate, while also remaining below the boiling point of the liquid phase.

In a two-step L-B film process, the desired component or substrate is separately coated with a very thin layer of adhesive and the one-step L-B film process proceeds as above using the smooth intermediate layer of adhesive. The monolayer and component can then be combined using vacuum molding or compression curing with shrink tape methodologies found in traditional composite manufacturing processes. The additional step of coating the component or substrate with a thin layer of adhesive can provide a topographically smooth surface to which the monolayer hBN can be transferred. Additionally, the thin layer of adhesive can act to directly fixate the hBN monolayer making it mechanically robust and allowing subsequent layers to be applied if required. Components with very rough topographies, like glass-fiber reinforced polymers (GFRP), demonstrate enhanced thermal performance with the two-step L-B film. Components with smooth topographies generally would perform similarly thermally; however, the two-step method can provide superior mechanical robustness to ensure the thermal spreading layer is strongly applied. The adhesive can be, for example, an epoxy resin, a cyanate resin, a polyester resin, a polyimide resin, an organic silicone resin, a polytetrafluoroethylene resin, a cyanoacrylate, a bimaleimide resin, a polyether ether ketone resin, a phenolic resin, a polyethylene resin, or any combination thereof.

Thicker hBN films can be produced by plasticizing, for example, about 60 volume percent hBN and epoxy or adhesive slurries with acetone or a solvent followed by traditional mold or tape casting of the slurry to form a thick uncured film on a component such as an uncured fiberglass reinforced polymer prepreg. Additionally, the component can be layered on top of the thick thermal film after casting onto a work substrate. The layered structure including the thermal layer and the component layer can then be consolidated via a vacuum molding process or shrink wrap molding process or autoclaving process or a combination of these to produce strong, fully cured parts with thermal spreading layers that are mechanically connected to the component.

The present methods can use a high volume percent hBN suspension, such as about 60 v %, where the other component is an adhesive or binder. The volume percent hBN t can be in the range from about 1 to about 99 percent, such as about 10 volume percent, about 20 volume percent, about 30 volume percent, about 40 volume percent, about 50 volume percent, about 60 volume percent, about 70 volume percent, about 80 volume percent, or about 90 volume percent, depending on the desired application. A solvent can be optionally added in any amount, for example, to adjust viscosity, penetration, or drying time. For example, the adhesive and solvent can be used along with methods herein to provide durable superhydrophobic functionality, as is discussed in more detail in Example 4.

The technology can provide processing methods to partially or fully coat substrates or components with a single or multiple layers of hBN to improve thermal conductivity in-plane.

A Langmuir-Blodgett (LB) technique can enhance platelet percolation along the basal plane to take advantage of high in-plane conductivity of hBN while maintaining a thin film. The technology can provide any sandwich structure (e.g., A-sandwich, C-sandwich) to combine hBN with GFRP to create thermally conductive and strong dielectric composites. The processing methods can avoid delamination risks involved in combining diverse materials. The processing coatings and methods can be applied flexibly or rigid, and Example 1 provides examples for preparation of hBN coatings and effective hBN-coated FG composites.

The technology can reduce local hotspots that can affect electrical and mechanical behavior. The technology can decouple thermal conduction from electronic conduction via material identity. The technology can provide significant thermal spreading with relatively small electrical interference. The benefits can be achieved with low cost materials.

The technology can be used in a variety of products and commercial applications. Examples are radome materials and coatings, including for aerospace, naval, and terrestrial environments; RF components; printed circuit boards, CPUs (central processing units), or GPUs (graphics processing units), especially in heat spreading layers thereof to reduce thermal loading; circuit boards; transparent or translucent thermal coatings; and thermal management within batteries and in cell packaging.

Figure 5:
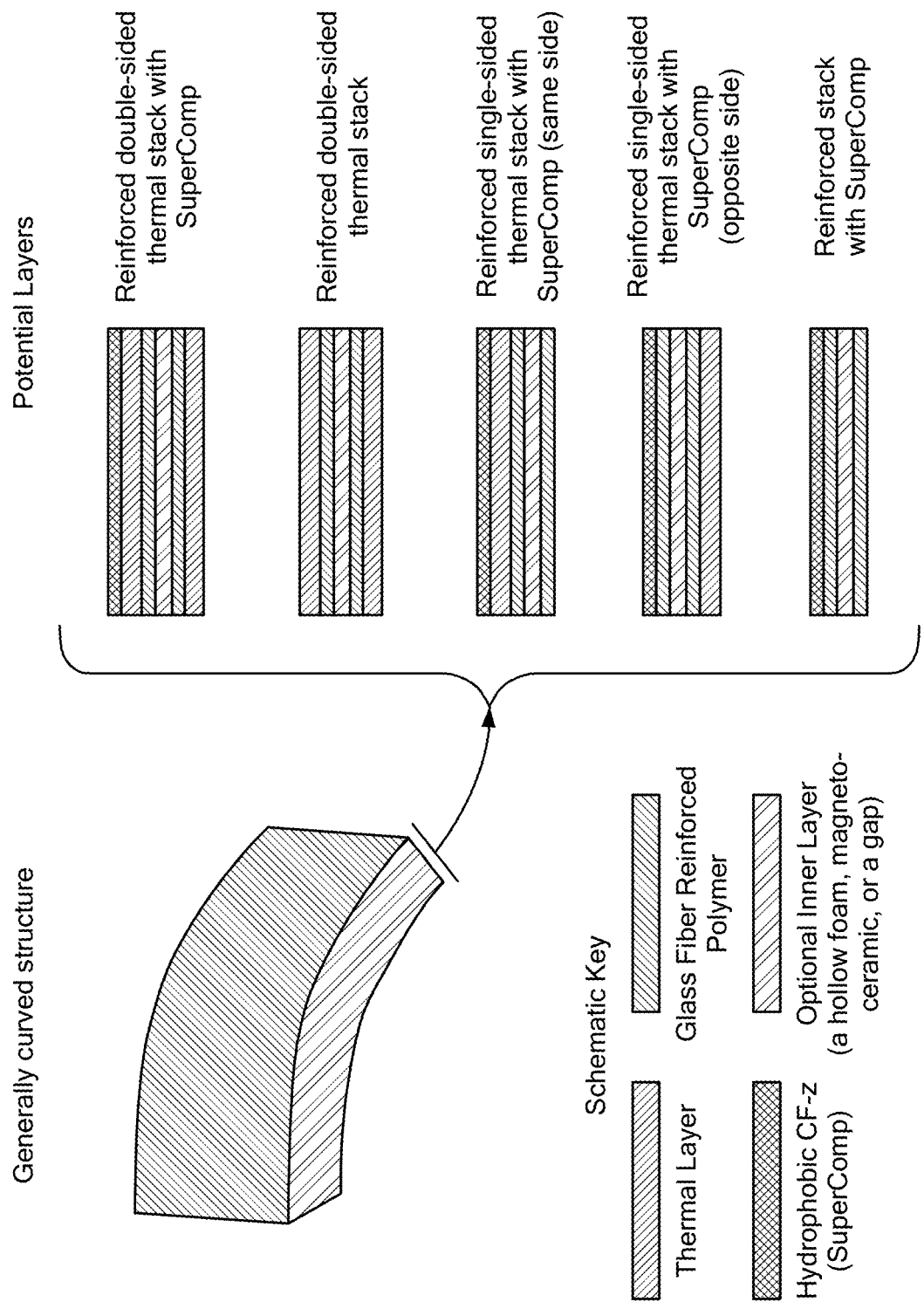
FIG. 5 shows a schematic illustration of different layer combinations for multilayer composites.
Figure 6:
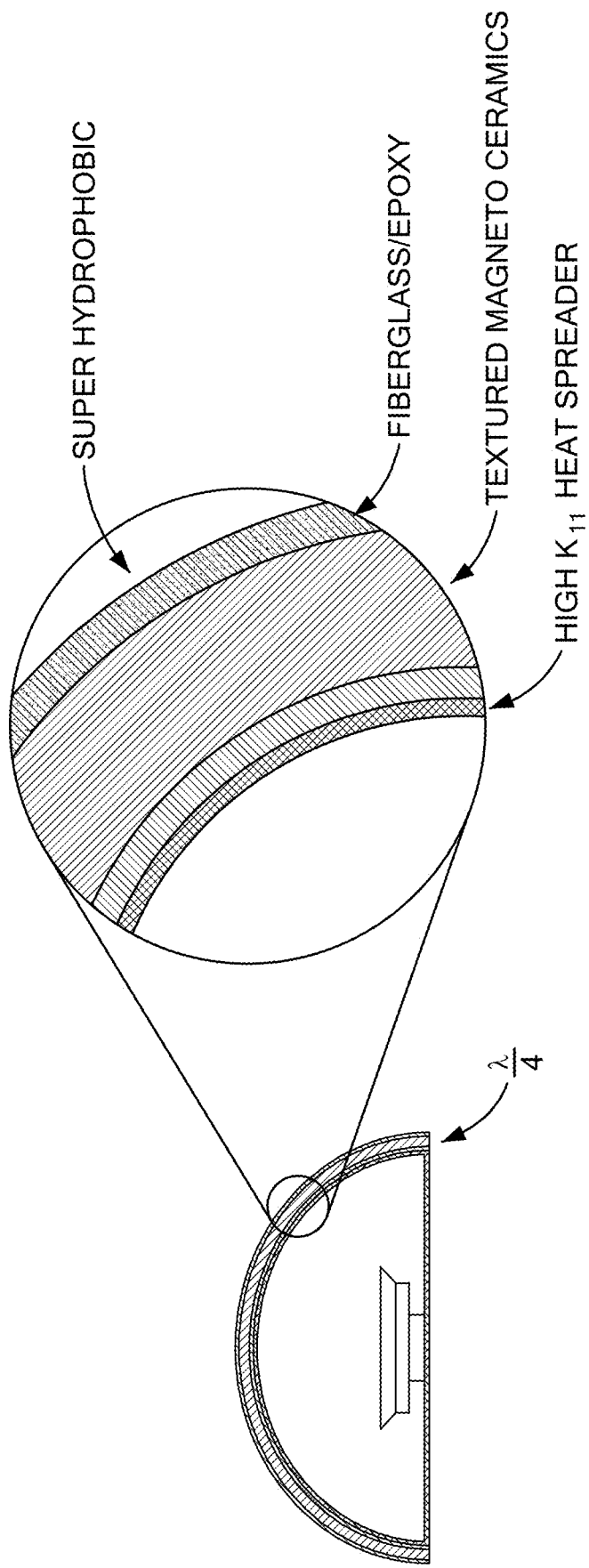
FIG. 6 shows a schematic illustration of an embodiment of a multilayered radome composite. Moving from the inside (left side) outward (toward the right), layers include the hBN thermal heat spreading layer, a first GFRP layer, a textured magneto-ceramic layer, a second GFRP layer, and a superhydrophobic wear resistant outer layer.

Multilayered composites and structures described herein, such as a radome structures, exhibit improved mechanical rigidity, thermal management, durable hydrophobicity, and tunable band-pass capability compared to previous materials. The technology addresses previous limitations with low-loss or even no-loss engineered ferrites, which suffer from mechanical brittleness, water adsorption, and non-negligible thermal conductivity. Previous thermal management solutions are often active, energy intensive, and require systems-level infrastructure and design. Water accumulation on RF systems poses a significant performance challenge, as well as typically requiring energy intensive mitigation. Wear resistance and mechanical robustness are essential to longevity and to proper function. With the present technology, thermal and water management can be combined in a customized and robust solution. FIG. 5 shows exemplary layer combinations according to the present technology for multilayer composite material stacks. FIG. 6 shows an example that can be implemented as an A-sandwich with any tuned thicknesses, for example in a radome.

Most materials can interact with RF signals. RF signals include electromagnetic energy waves that can radiate from a conductor (antenna) into space with frequencies from about 20 kHz to about 300 GHz. The class of RF materials includes both materials that are good at absorbing RF waves (high-loss materials generally with high electrical permittivity) or are good at transmitting RF waves (low-loss materials generally with very low electrical permittivity). Materials in between high-loss and low-loss (most materials) are less useful for the design and engineering of RF systems. One RF system that represents a low-loss material application is a radome in which an enclosed RF antenna needs to communicate with the outside world. The radome serves as a visual, thermal, and elemental protective shield for the antenna. However, the radome can also work as a shield that can to reduce the transmittance of the RF signal at certain frequencies.

An ideal radome addresses the visual, thermal, elemental and electromagnetic requirements to function well in the application of low-loss RF transmission through a solid object. The ideal radome material should therefore be multifunctional. Several features of a desirable radome material can include optical opacity, extreme low-loss, mechanical robustness, wear-resistance that is super-hydrophobicity, and thermal management.

Low-Loss Radomes

A radome generally is benefitted by minimizing the lossiness of the selected material. An exception when selective lossiness in certain bands is desired but not in others (e.g., creating bandpass RF filters on the radome). Low-loss materials such as polyethylene and even epoxy have been considered for this application. In addition, epoxy and fiberglass composites can be somewhat lossy but are still widely employed due to their mechanical benefits. Radome composites often layer their epoxy and fiberglass in specific lay-up architectures so as to minimize loss, for example, by creating $\lambda/4$ geometries that utilize perfect incoherence to reduce reflected signal and thereby increase transmitted signal.

Engineered ferrites can be used to take advantage of the interaction between RF signals and organized magnetic microstructures. Some systems are essentially no-loss, exhibiting inductive matching with free-space (Z=1). Such no-loss materials have the potential for minimizing their interaction with an RF signal, thereby being "invisible" in a region. In some applications, such a material represents an ideal case. Even with a perfect no-loss radome material, however, a rainstorm can transition it from no-loss to low-loss, and even to high-loss simply by depositing water droplets on the structure. These engineered ferrites exhibit hydrophilicity (contact angles around 45°), meaning that most of the radome would remain wet during and well after a rainstorm. Further, ferrites can be dense polycrystalline ceramics that are inherently brittle and can catastrophically fail under significant or repeated impact (e.g. direct ballistic impact or a few hailstorms). Further, these ceramics tend to have reasonable thermal conductivities which make it difficult to isolate the RF equipment from broad external temperature swings. The thermal strain from these temperature changes can affect device performance significantly over time.

Implementing engineered magneto-ceramics and/or radomes with $\lambda/4$ stack-up geometries is known technology which can be implemented herein. The technology described herein can be used to add additional layers to the ferrites or used to construct a hollow core structure (e.g., air core) typical of $\lambda/4$ radomes.

Mechanical Robustness

Radomes should withstand various types of loading conditions from the environment and the surrounding engineered structure. If no-loss ferrites are to be used, several drawbacks to be addressed include their mechanical integrity. Due to the brittle nature of ferrite ceramics, the structural integrity of the multi-layered ferrite core composite can be improved with the addition of two glass-fiber reinforced polymer (GFRP) layers in an A-sandwich style design. This design provides a tough outer shell that reduces the chance of premature brittle fracture damaging the radome's performance while minimizing the lossiness of the GFRP addition.

The present technology can provide an A-sandwich design, a C-sandwich design, a half-wave design, quarter-wavelength thicknesses, twelfth-wavelength thicknesses, or any thickness designed for band-pass, strength, durability, filtering, resonance, transmission, reflection, or shielding, for example. Band-pass filters can be designed along with the thermal spreading or dissipation technology and super-hydrophobic durability.

For high performance GFRP-based radomes, a suitable material combination is a quartz fabric-reinforced cyanate ester composite due to the excellent electrical, mechanical, and thermal properties. Quartz-reinforced cyanate ester composites are, however, expensive to create. In examples of multi-layered composites described herein, a glass fabric and an epoxy resin (or other suitable binder or adhesive) can be used in place of the cyanate ester matrix. This replacement is less costly and can mimic the high-performance materials from a processing viewpoint and rapidly develop easily transferrable procedures. In addition, epoxy-based glass-fiber reinforced composites can offer suitable electrical, mechanical, and thermal properties for low-cost, mid-performance radomes.

Figure 7A:
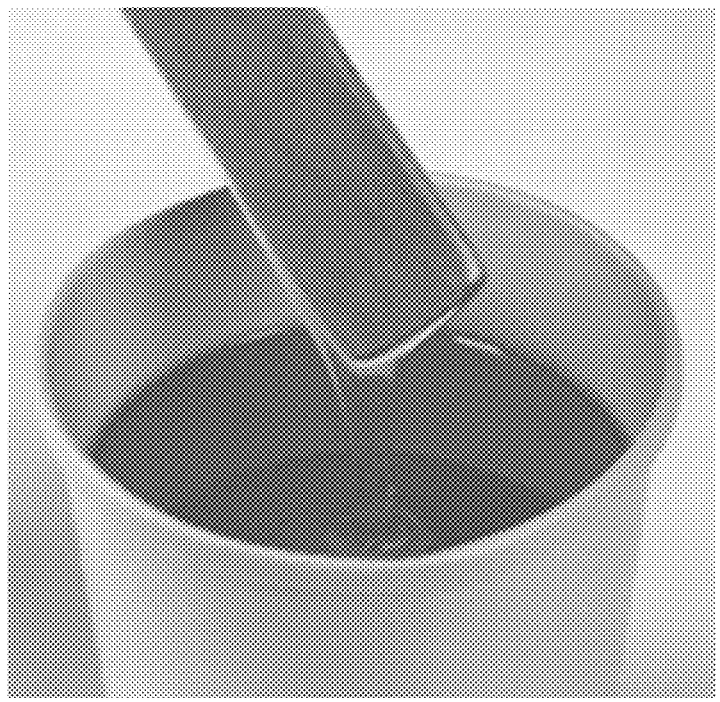
FIG. 7A shows a photograph of a step of coating a substrate with a high temperature epoxy resin.
Figure 7B:
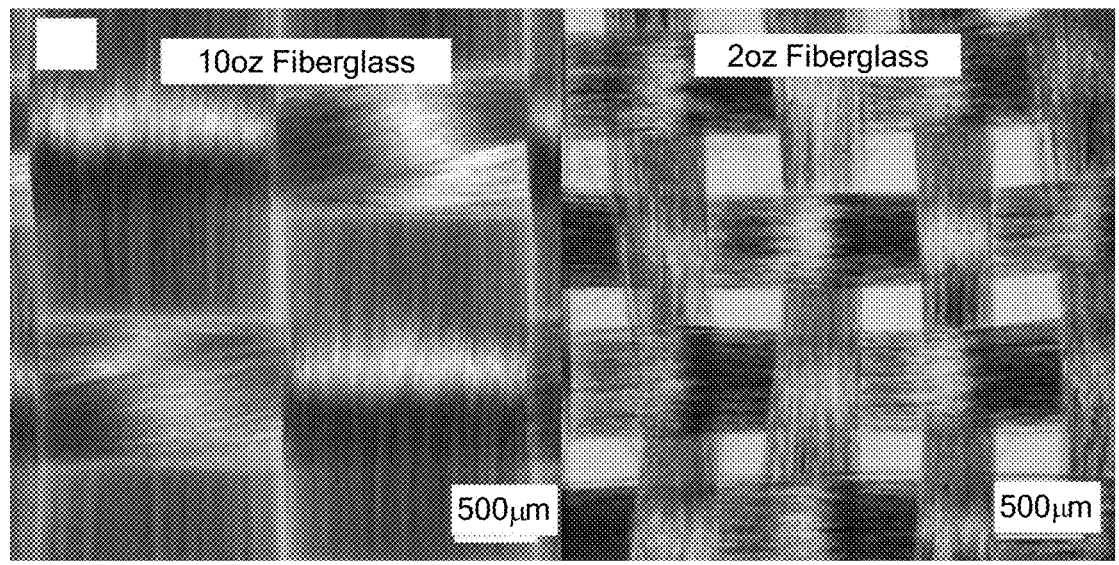
FIG. 7B shows a photomicrograph of two different weights of fiberglass fabric, both plain weave.
Figure 7C:
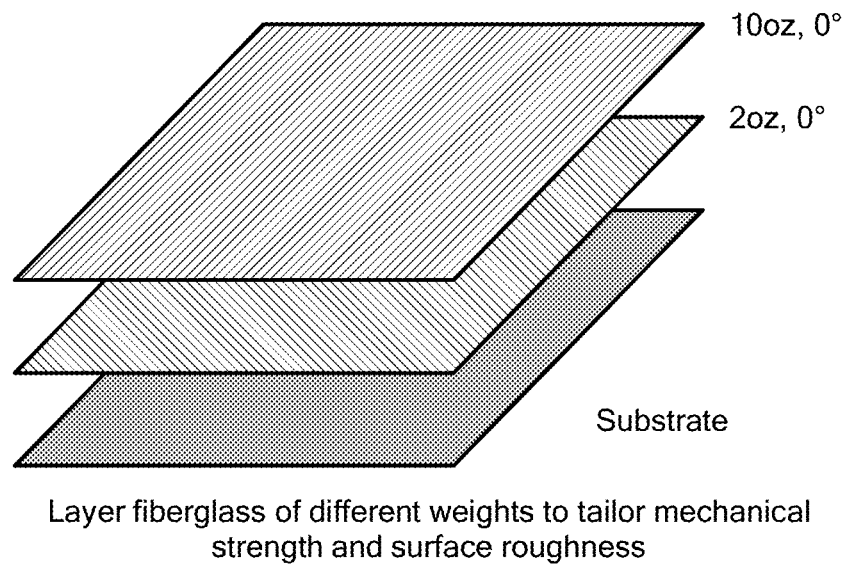
FIG. 7C shows a composite containing a finer woven 2-ounce glass fiber fabric placed between a substrate and a heavier woven 10-ounce glass fiber fabric to improve adhesion and reduce void formation.
Figure 7D:
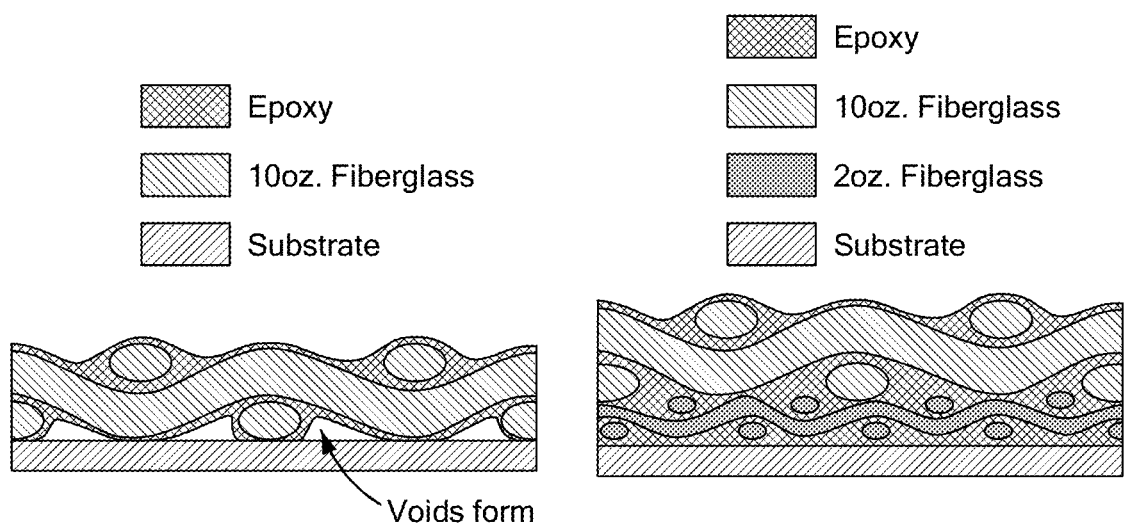
FIG. 7D shows a schematic cross-section of void filling with the composite shown in FIG. 7C.

To improve the mechanical integrity of the multilayer composite, the GFRP should (i) provide acceptable mechanical strength especially in the case of direct impact, and (ii) allow good adhesion between the neighboring layers to provide the mechanical reinforcement effects within the multi-layered composite. To provide an example for these sets of experiments, a standard high strength, low viscosity, laminating epoxy resin (System 2000, FIG. 7A) and two different weights of glass fiber (GF) fabric with a plain weave (2 ounce and 10 ounce weights) can be used, both provided by Fibre Glast, and both are shown in FIG. 7B. Typically in continuous fiber composite designs, coarser fabrics (e.g., medium weight) can provide better mechanical reinforcement but do not always adhere well to flat surfaces due to the roughness of the fabric surface combined with poor flexibility. On the other hand, very fine fabrics (e.g., lightweight) can allow better flexibility and can contour well to rough surfaces but do not always provide the required mechanical strength. To this end, a combination of a medium weight and lightweight GF (or FG) fabric is used to improve adhesion to the neighboring layer and provide good mechanical strengthening, as shown in FIG. 7C and FIG. 7D. This layering structure is especially useful with the addition of a very flat ferrite core or similar substrate. Experiments show that in cases only using the 10 ounce medium weight fabric, the stiff fabric is unable to completely flatten and creates voids at the interface. However, with the addition of the flexible 2 ounce GF fabric, the voids are filled creating a continuous epoxy matrix and improves adhesion to the surface. In addition, due to the rearrangement of the 2 ounce fabric into the voids, this modification adds a very small increase in overall thickness, demonstrated in FIG. 7D, which shows a schematic of void filling with finer weave fabric.

Thermal Management

The ability for a radome to dissipate heat generated from within the structure or from the external environment is desirable for stable electrical and mechanical properties. Thermal heat spreaders exist for commercial applications; however, existing heat spreaders (e.g., metallic coatings) may not provide the ideal electrical characteristics for radome applications and generally require a thick coating, impeding the RF transmittance. Coating the interior or exterior of the radome with a thin dielectric composite exhibiting high thermal conductivity in the X-Y plane can provide a heat dissipating layer or film. This film can allow hot spots to easily dissipate through the material, reducing the maximum temperature and maintaining a uniform temperature throughout. Exterior coatings by the same methodology are viable, especially for nose-cone radome applications in which localized hot spots from air drag are generated, a condition exacerbated in supersonic flight.

hBN exhibits excellent in-plane thermal conductivity with values reaching as high as 600 $W \cdot m^{-1} \cdot K^{-1}$. In addition, hBN has suitable electrical and mechanical properties for radome applications, making it a prime candidate for example thermal heat spreaders. hBN in platelet form is particularly suitable for use in thermal heat spreaders due to the large aspect ratio and excellent thermal conductivity along the basal plane. In addition, platelets with large aspect ratios can be manipulated to create composites with an aligned microstructure, therefore creating a percolated network within the composite and thermal pathways through the basal plane of each platelet. Herein for example, two methods are described to create high volume fraction thin film hBN-epoxy composites with excellent x-y plane alignment. The coatings described are made by either (i) aligning a single monolayer of hBN <1 μm thick on the desired substrate, or (ii) creating thin 50-600 μm films of 60 v % hBN platelets with excellent percolation on the desired substrates. The thermal heat spreading capabilities of both systems are shown using a custom-built infrared thermography set-up. See the hBN description above for additional details.

Wear-Resistant Superhydrophobicity

Hydrophobicity is intimately related to the physiochemical characteristics of a material's surface, which can be influenced by microstructure and surface functionalization.

This property can be used in radome structures to minimize the accumulation of water during rain or dew events and to promote self-cleaning, preserving the functionality of the radome by reducing electrical interference. The structure needs to be tough and consistent over time, so a self-similar structure is desirable for this application. Here, a self-similar material is defined as one that wears evenly and its hydrophobic properties do not change as it wears.

Accordingly, the technology can describe a family of radomes produced by laminating materials of distinct properties together to simultaneously address two or more of the characteristics of a high performance radome including low-loss, mechanical robustness, thermal management, and wear-resistant super-hydrophobicity. Low-loss can be addressed by implementing tunable engineered ferrites described elsewhere. These ferrites are brittle, hydrophilic, and poor thermal conductors (i.e. insulators). To improve the brittleness, very thin sheets of fiberglass composites can be laminated in a sandwich type configuration using the magneto-ceramic in place of structural foam. To preserve the low-loss characteristics of the magneto-ceramic, the thin fiberglass layers can maintain λ/4 spacing to minimize reflections. To provide wear-resistant, super-hydrophobicity, a self-similar, super-hydrophobic layer can be laminated to the outside of the radome capable of shedding water from rain. Durability of superhydrophobic layers can be enhanced by partially penetrating the layer with adhesive as described herein. In some examples, the superhydrophobic layer is completely penetrated (or coated) with adhesive, and some of the outer adhesive is later degraded away. Durability of superhydrophobic layers can be enhanced, for example, as is shown in Example 4. To address thermal management, a combination of insulators and heat spreaders are described herein.

A hexagonal boron nitride (hBN) filled heat spreader as described above can be used for the interior or exterior surface of a sandwich composite to ensure that localized heat is redistributed across the radome chamber. To demonstrate efficacy of this multi-material radome architecture, full sandwich layered structures have been fabricated and found to exhibit excellent mechanical stability, thermal spreading, and hydrophobicity. In Example 2, the multilayered radome composite schematically shown in FIG. 6 was successfully fabricated. Moving from the inside out in FIG. 6, layers include the hBN thermal heat spreader, textured magneto-ceramics, two GFRP layers for added mechanical stability and strength, and a superhydrophobic wear resistant outer layer.

Figure 8A:
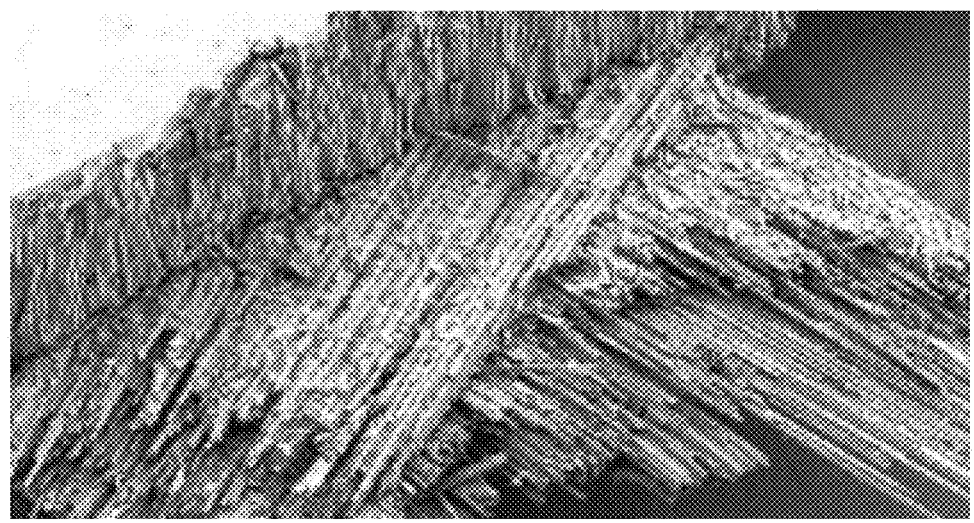
FIG. 8A shows an SEM image of a superhydrophobic material (SuperComp) in cross-section, showing the x-y fiber weave and the z-aligned fibers above.

In order for the radome to be robust against the elements, such as impending water droplets, sleet, hail, or more significant impacts, an outer laminate was added to the radome stack up that exhibits wear-resistant super-hydrophobicity. An example of such a material that has been successfully tested is Boston Materials' SuperComp products, which exhibit milled fibers in the z-direction in a dense layer on top of a traditional x-y fiber weave (FIG. 8A). These materials offer the advantage of being tunable towards super-hydrophobicity and the secondary benefit of having high out-of-plane impact strength. Super-hydrophobicity in these substrates can be achieved by treating the SuperComps so that the milled fiber is only partially embedded in an epoxy matrix. Partial embedding can come from conventional vacuum impregnation methods in which insufficient resin is delivered to fully encapsulate the milled fiber. Partial embedding can also be achieved by fully encapsulating the SuperComp and then subjecting the cured material to sandblasting to preferentially deteriorate the epoxy binder, leaving behind exposed milled fiber. These highly topographic surface texturings can additionally be coated with hydrophobic coatings (e.g., PTFE spray). In addition, this material can be easily incorporated into the processing to create multi-layer radome composites. This structure can use Z-axis aligned fibers within the X-Y fabric weave to improve the impact resistance of the composite and simultaneously creates the desired surface texturing. It is hypothesized that as the material begins to wear and is chipped away, it reveals more of the underlying fibers and continues to exhibit the superhydrophobic structure. The superhydrophobic layer can be resistant to UV light, radiation, temperature changes, gases or chemicals, and can be any color. In some examples, the Z-axis aligned fibers can be provided without the underlying X-Y fabric weave.

Such a model for a hydrophobic layer in the described radome system can be described by reference to a lotus leaf.

The leaf surface combines physical texturing along with hydrophobic surface chemistry to increase water droplet contact angle and promote non-wetting behavior. Although a lotus leaf exhibits super-hydrophobicity, the surface is highly fragile, comprised of micro pillars and nanoscale wax crystals that fracture under pressure, destroying the hydrophobic properties. This fragile surface structure is also common with synthetic superhydrophobic materials, especially when exposed to short, high impact forces or abrasion. Most commercially available superhydrophobic materials utilize surface coatings which incorporate chemistry and physical texturing to achieve the desired properties. However, these materials are highly vulnerable to delamination and peeling, and the properties will not withstand abrasion such as scratches or dents. In the case of radomes, the surface must be tough, impact resistant, and resistant to surface wear while maintaining the superhydrophobic and electrical properties.

Figure 8B:
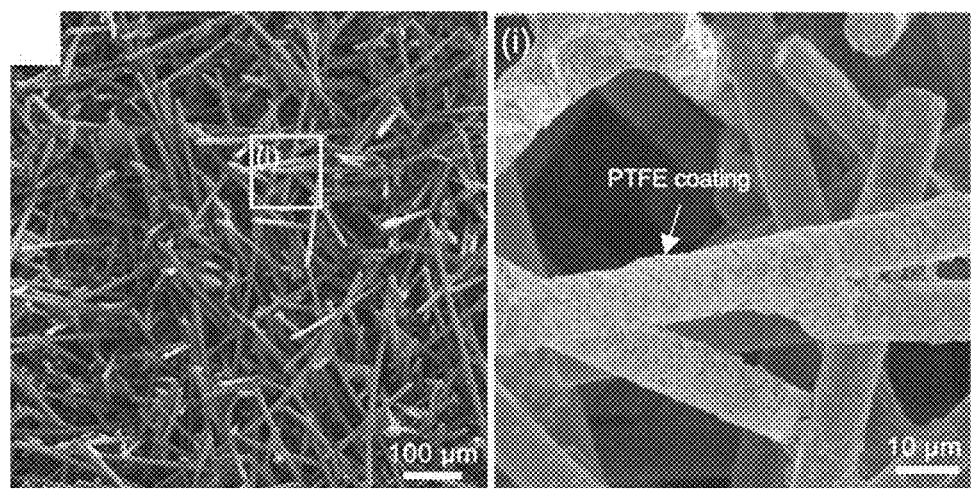
FIG. 8B shows an SEM image of the SuperComp material without epoxy impregnation (left) and a high magnification image revealing the applied PTFE coating (right).
Figure 8C:
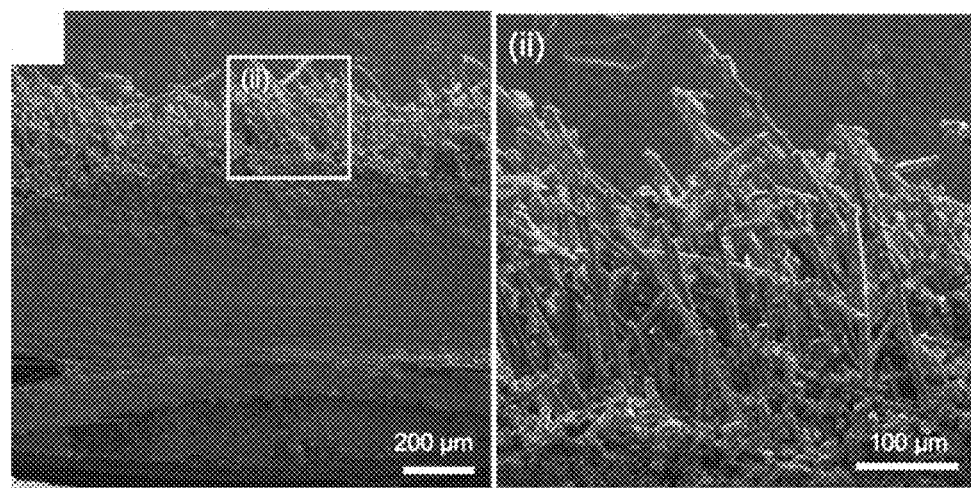
FIG. 8C shows an SEM image of a cross-section of SuperComp material (left), with a higher magnification showing partial epoxy impregnation of the z-aligned fibers with inset (right).
Figure 9:
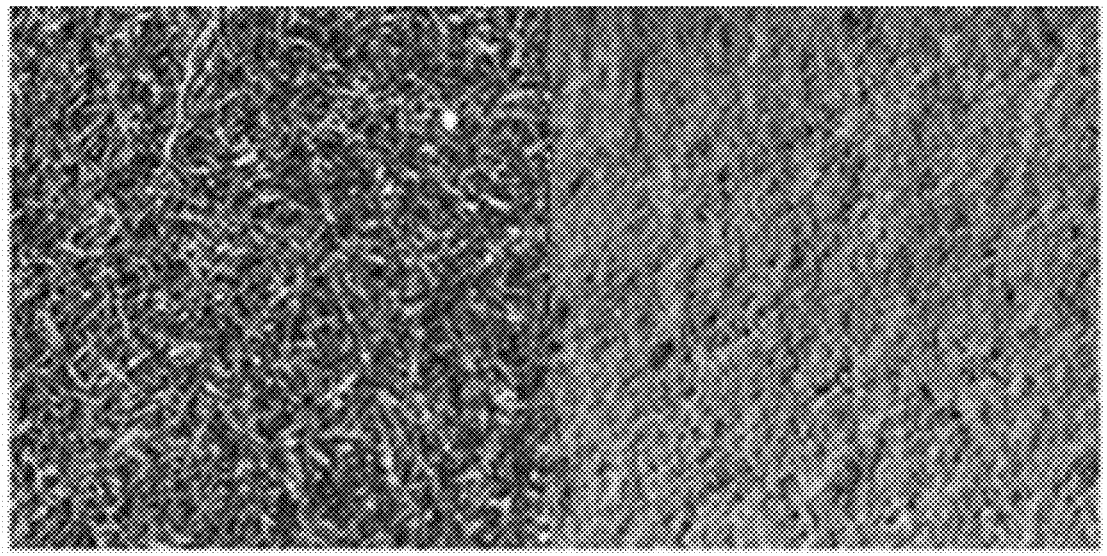
FIG. 9 shows SuperComp material surface before (upper left) and after (upper right) sandblasting. The lower images show corresponding contact angle measurements.
Figure 9:
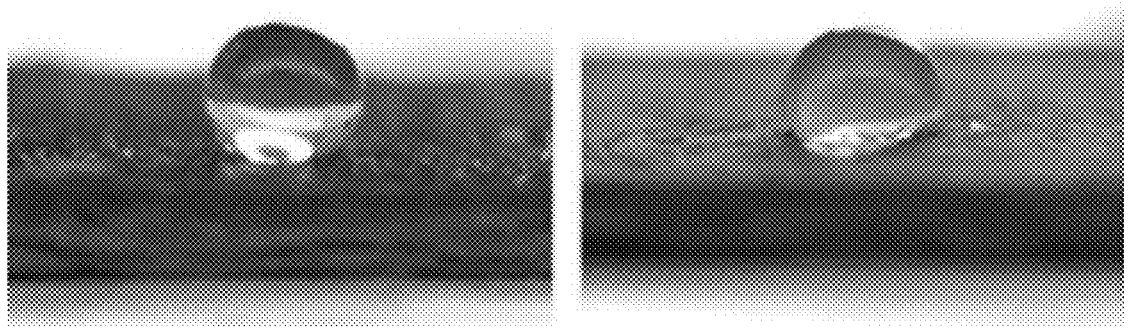

In Example 4 it is shown that SuperComp composites, which are created from a plain-weave fabric with short ~150 µm long fibers aligned perpendicular to the fabric in the Z-direction (FIG. 8A), can be purposefully starved of epoxy resin. In some examples, the purposely starved composite can then be impregnated with epoxy resign. It can be seen in FIG. 8C that the epoxy matrix can impregnate approximately half of the milled fibers leaving the other half exposed outside of the matrix To bring super-hydrophobicity into the radome, it is shown herein that the wear resistance of these composites following sandblast testing was excellent, showing wear on the surface but free from large defects and deformities. All samples retained their overall shape and structure, with wear occurring only at the surface. Even after extreme sandblasting (Example 4), the contact angle stayed hydrophobic, dropping down to 117.4° as shown in FIG. 9. Thus, the present technology is a step towards an impact and wear resistant, self-similar material that exhibits superhydrophobic behavior even in the case of surface damage.

While the SuperComp composites are provided as examples, any low-loss superhydrophobic coating can be used in the outlayer of the radome composite material.

Multilayered Composites for Radomes

The present technology provides for high performance radome composites by combining one, two or more of the features described above, including: super-hydrophobic coating, thermal management, mechanical robustness, and low-loss RF magneto-ceramic. Several examples of multilayered composite materials combining these features are in the Examples. Here, interlayer adhesion is of vital importance to creating a useable composite material. A well-joined interface translates to better mechanics, enhancing stress transfer and lowering the chance of layer delamination. Functionally, the strong bond between layers means that heat can transfer more effectively into the thermal spreading layer, the wear resistance of the superhydrophobic layer is improved, and the mechanical strengthening of the GFRP layers can better protect the magneto-ceramic or air core.

The present technology describes designs for and has experimentally delivered a multilayered composite to solve some engineering barriers in radome designs. A high-performance barium hexaferrite core can be coupled with additional thin composite layers to address the mechanical, thermal, and hydrophobic requirements of a high-performance low-loss, ferrite radome. To achieve this, each layer is designed to combat a particular issue, then the layers are laminated together to create a high performance multilayered radome composite. These type of A-sandwich radome structures can be employed in fiberglass constructions to minimize RF loss. The tuned ferrite may be able to offset the loss of the composite layers, while the composite layers similarly offset the mechanical, thermal, and chemical shortcomings of the ferrite.

The mechanical reinforcement layers can be achieved through laminating various weights of glass fibers and impregnating them with an epoxy resin (or an adhesive) to create a mechanically tough barrier and protect the ferrite core. In addition, these layers can serve as intermediate layers between the thermal spreading layer, the ferrite, and the superhydrophobic layer to promote adhesion and improve wear resistance.

Thermal gradients are a significant issue in the electrical and mechanical performance of radomes; therefore processes are described to laminate highly aligned hBN films to various substrates to improve the thermal spreading and reduce the overall thermal gradients (e.g., hotspots) of the composite. In this composite, hexagonal boron nitride (hBN) platelets exhibiting a high in-plane thermally conductivity are incorporated into an epoxy matrix using either a monolayer geometry or a high volume fraction hBN composite. These composites show excellent thermal spreading abilities in the X-Y plane and can be used to improve the electrical and mechanical reinforcement of the final radome.

Water accumulation on the surface of radomes is detrimental to RF transmittance. Current superhydrophobic materials do not provide a suitable mechanical strength and self-similar properties in order to survive harsh environmental conditions. To address this, Boston Materials SuperComp Z-aligned composites are modified to exhibit excellent wear resistance and hydrophobic behavior. These composites can be used to achieve superhydrophobic self-similar properties while maintaining excellent impact and surface abrasion properties. Glass fiber SuperComps exhibit compatibility with radome applications.

The technology described herein can be used to prepare customized radome stacks, PCBs, and heat spreading layers for any desired electrical components, circuits, antennas, or used in RF transmission and/or reception. Some example features and advantages of the technology can be a robust aligned hexagonal boron-nitride layer for high-performance dielectric heat spreading, a wearable z-aligned fiber outer layer that exhibits super-hydrophobicity and excellent durability, the ability to tie these layers together along with strengthening glass-fiber reinforced-polymer, and excellent interlayer adhesion between disparate materials. The individual layer components can include relatively inexpensive and common materials. The technology can provide customizable layering architectures.

EXAMPLES

Example 1

Preparation of hBN Coatings and hBN-Coated FG Composites

Monolayer films were created with the L-B (Langmuir-Blodgett) process using water, hBN, ethanol, and detergent. A solution of 25 mg/mL hBN platelets in anhydrous ethanol was dispersed in a bath sonicator and continuously sonicated for even dispersion. 13 mL of the hBN-ethanol solution were slowly pipetted into 700 mL of deionized water to form a monolayer at the air-water interface. 11.7 µL of 10.5% aqueous dishwashing detergent (DAWN ULTRA, Proctor & Gamble) were added to the center of the dish to condense the hBN platelets into a densely packed monolayer (e.g., FIG. 1A, bottom right). For a one-step monolayer the component or substrate was then used to directly pick up the hBN, resulting in the final coated part. In the case of a two-step process a flat metal substrate was used to collect the monolayer using the L-B method. In both cases the solvent on the substrate was evaporated in an oven at 60° C. for 45 minutes. If multiple monolayers were desired, the substrate or component was sprayed with an epoxy binder and the process was repeated. The two-step process continued on to vacuum molding (detailed below). These processes were repeated for three hBN platelet sizes: 5 µm, 12 µm, and 45 µm (PT132, PT120, PT110; Momentive), but the 45 µm platelets were used in most cases.

To create cast-molded thin films, hBN platelets were added to epoxy (2120/2000 hardener and resin, FibreGlast) at 60% v/v and thinned with an equal weight of acetone. The acetone was added stepwise to ensure uniform incorporation and mixed in a FlackTek DAC 150.1 FVZ-K Speed Mixer at 2500 RPM for 30 seconds. It was preferable to use acetone, as it only plasticizes the epoxy-hBN slurry without chemically altering it. Speed mixing while the slurry viscosity is high sheared platelet aggregates apart. Adding the bulk acetone reduced slurry viscosity to a castable value. The slurry was poured into a foil mold coated with a mold release agent and left for 1 hour to evaporate all residual solvent. To create various thicknesses, the total slurry volume was increased or reduced depending on the desired final thickness of the heat spreading layer. hBN films ranged in thickness from about 100 µm to about 600 µm depending on the initial volume of the hBN-epoxy slurry. Samples were prepared following the same process for three sizes of hBN platelets (5 µm, 12 µm, and 45 µm). It was found, however, that the smaller platelets compacted more than larger platelets during the solvent evaporation process, ultimately creating cracks within the thermal spreader layer. Therefore, 45 µm platelets were preferred for thicker cast-molded films.

An industry standard vacuum molding process was used for both the two-step monolayer and cast-molded hBN films, with materials provided by FibreGlast. A 3"×3" piece of woven fiberglass (FG), 2 ounce weight, oriented at 0° to a second coarser-weave piece of FG (10 ounce weight) was pre-impregnated with epoxy by the hand lay-up method. It was found that layering the different FG weights improved uniformity in the BN layers that transfer over. The finer weave of the 2 ounce FG allowed it to fill in the coarser gaps of the 10 ounce weave, leaving the hBN essentially undisturbed, while use of only the 10 ounce weave left sizeable gaps and voids within the composite (FIG. 7D). In addition, using various combinations of the two FG weights allowed coating of a variety of mechanical structures to be achieved. The FG fabric was carefully placed onto the prepared hBN films (monolayer or thick films) with the 2 ounce side in contact with the platelets. FG-hBN layering in the vacuum molding process remains important for sample uniformity. Vacuum molding with the hBN on top of the FG-epoxy exhibits similar sedimentation effects to those detailed above. The pre-impregnation step is also crucial, as it prevents delamination of the hBN from the FG. The sample was then cured overnight at 60° C. under vacuum (~−25 inches Hg). This process results in FG-epoxy composites with a hBN monolayer coating or a thicker hBN film coating.

Figure 1B:
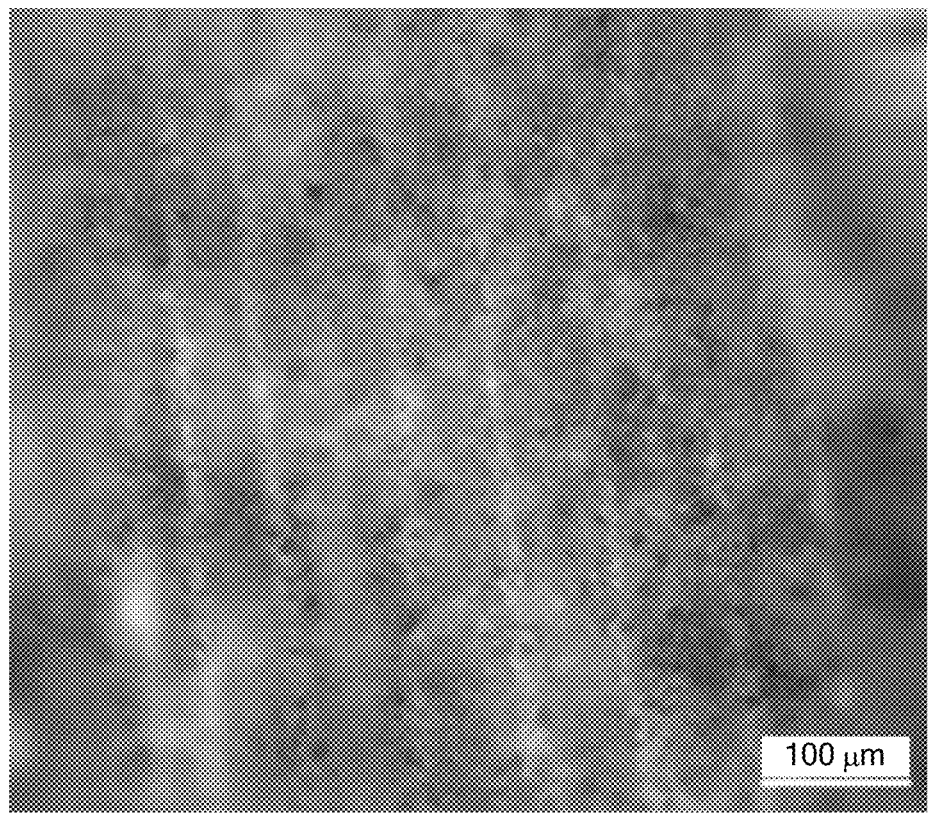
FIG. 1B shows a light micrograph of a 5 μm thick hBN layer coating the surface of a glass fiber bundle.

For L-B processing, the concentration of detergent or surfactant can dictate the platelet density at the liquid surface. Higher detergent concentrations push the platelets with enough force to project the platelets out into the space above the liquid surface, allowing them to spread along complex geometries more easily during solvent evaporation (FIG. 1A). This phenomenon was particularly observed with the 5 µm platelets (FIG. 1B). FIG. 1A shows a schematic of platelet piling with excess detergent addition (top right). FIG. 1B shows a 5 µm hBN layer coating the surface of a glass fiber bundle, showing excellent conformability. The surface interactions with the liquid are higher in the case of larger platelets, so higher forces are required to push platelets out into the space above the liquid. Therefore, if the desired application includes thermal spreading across complex geometries, smaller platelets are preferred despite some reduction in absolute thermal conductivity of the monolayer. In the absence of detergent, a monolayer still forms on the liquid surface, but it is less densely-packed and was found to introduce discontinuities in the thermal spreading layer. The net effect is that there is less percolation in the network, which can be mitigated by adding more hBN to the liquid than described above.

Direct L-B addition to the FG-epoxy component was investigated using the one-step method, and exhibited platelet sedimentation through the epoxy during curing, which lowered the effective percolation through the monolayer. This technique was superior to the two-step method non-flat substrates, where the standard vacuum molding process could fail to evenly transfer the hBN layer. The L-B technique is also preferred in a situation where a very thin epoxy layer is used, so the sedimentation of the platelets is reduced. One-step L-B without the epoxy binder produces a functional monolayer, but does not have the mechanical stability of the epoxy-bound composite.

Cast-molded films were performed using a tape-casting method instead of the slurry-based sedimentation method. While the thermal spreading ability of the tape-casting method was equivalent to the cast-mold process, the viscosity played a more prominent role using this technique and required fine control of the acetone or other solvent concentration. Tape casting requires more labor compared to cast-mold processing, therefore the cast-molding process was preferred. However, tape casting could be useful in construction applications to coat one side of a building material for use as a thermal spreader that reduces convection currents and insulates analogously to double-paned windows.

Example 2

Fabrication of Sandwich Structures

Different multi-layered composite samples were prepared and scaled up to domino-sized coupons. These samples were a composite of glass-fiber reinforced polymer (GFRP) mechanical reinforcement layers, hBN thermal spreading layers, and superhydrophobic layers and were made using the same materials and methods detailed above. Hexaferrite substrates were purchased from commercial vendors. Several layer permutations were used in the multi-layered composite structures, aimed at characterizing the different interfacial adhesions. The same vacuum molding process detailed above was used, and in some cases multiple iterations were required to achieve the multilayered sample. For example, both thermal spreading hBN layer and the CFz superhydrophobic layer performed the best if they were on the bottom during the vacuum molding process. Therefore, to achieve a superhydrophobic ferrite core composite with a thermal spreading layer, the ferrite went through two separate vacuum molding processes to adhere the desired layers to each side. Different orders of the layers also were investigated, including attaching the hBN thermal spreading layers directly to the ferrite cores.

In general, ferrite cores were prepared by first sanding the surface with 180 grit sandpaper, rinsing with water to remove residual dust, and dried at room temperature. The ferrite was then lightly brushed with epoxy resin to improve adhesion to the neighboring layer. The final multilayer composite was then prepared using the vacuum molding process previously outlined. In the case when a GFRP is immediately neighboring the ferrite core, an additional 2 ounce GF fabric was added between the ferrite and GFRP to improve the adhesion between the two layers. Every relevant layer permutation exhibited excellent adhesion, allowing a considerable degree of customization. Surface roughening was used to achieve good adhesion between layers. In addition, the ordering of the GFRP layers on the ferrite proved significant, in that the 2 ounce weave minimized voids when in direct contact with the flat ferrite surface.

Figure 10A:
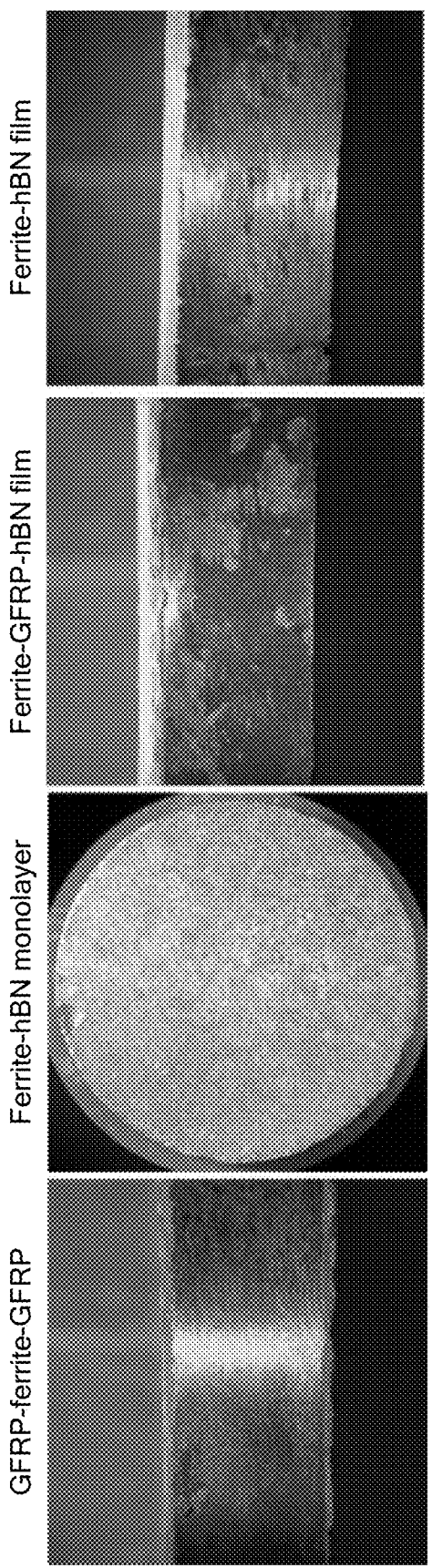
FIG. 10A shows different composite multilayer structures as top view or in cross-section.

Using basic hexaferrite substrates, the multilayered composite as illustrated schematically in FIG. 6 was successfully fabricated. This layering order placed the hBN thermal spreading layer on the interior, a GFRP mechanical reinforcement layer, a basic hexaferrite core, and the SuperComp outer shell for a superhydrophobic outer layer. The SuperComp outer shell contained milled carbon fibers of about 150 microns aligned in the Z-axis (i.e., orthogonal to the fabric and outer shell) as shown in FIG. 8A and FIG. 8C. Shown in FIG. 10A are multiple sandwich structures, and a created composite structure is shown in FIG.

Figure 10B:
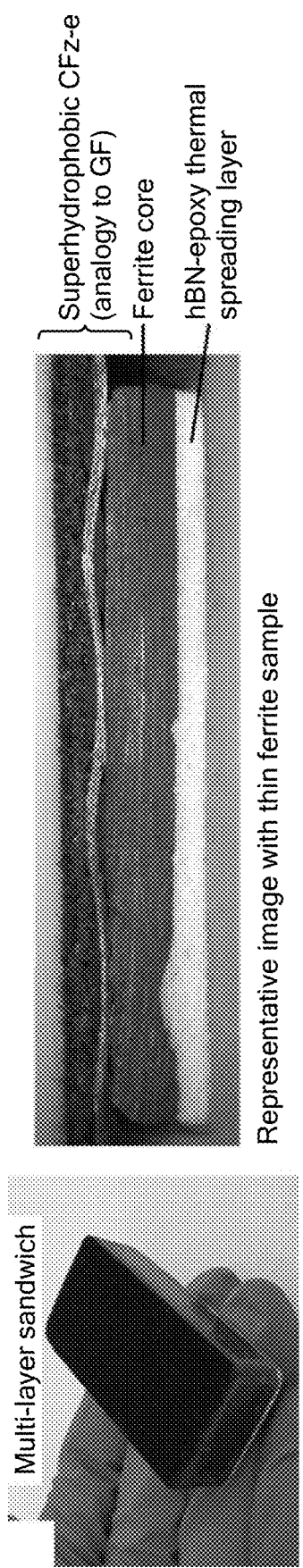
FIG. 10B shows an embodiment of a multilayer composite.

10B. The examples shown in FIG. 10A show permutations of multi-layer structures on dime-sized samples. The example shown in FIG. 10B shows a final multi-layer sandwich on a larger scale and a side-view showing the individual layers. hBN thin layers and monolayers could be added to ferrite directly or with an intervening GFRP layer.

Example 3

Thermal and Microstructural Characterization

Figure 2A:
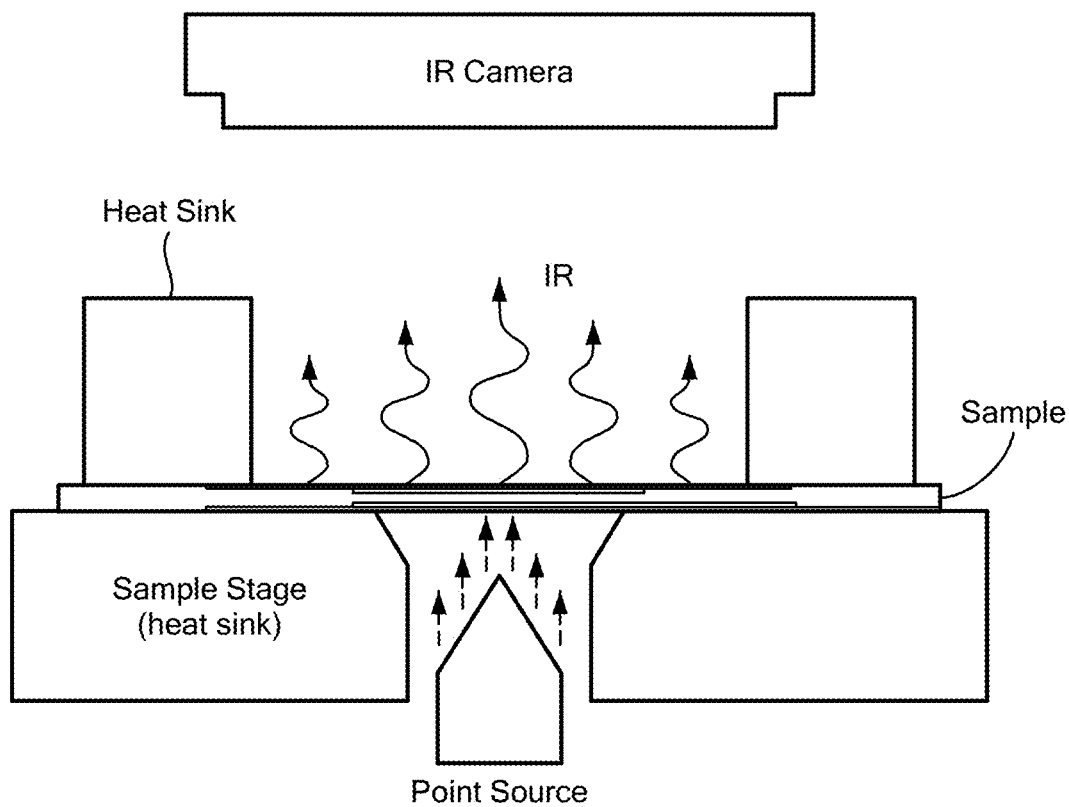
FIG. 2A shows a schematic diagram of an experimental setup for thermal imaging.
Figure 2B:
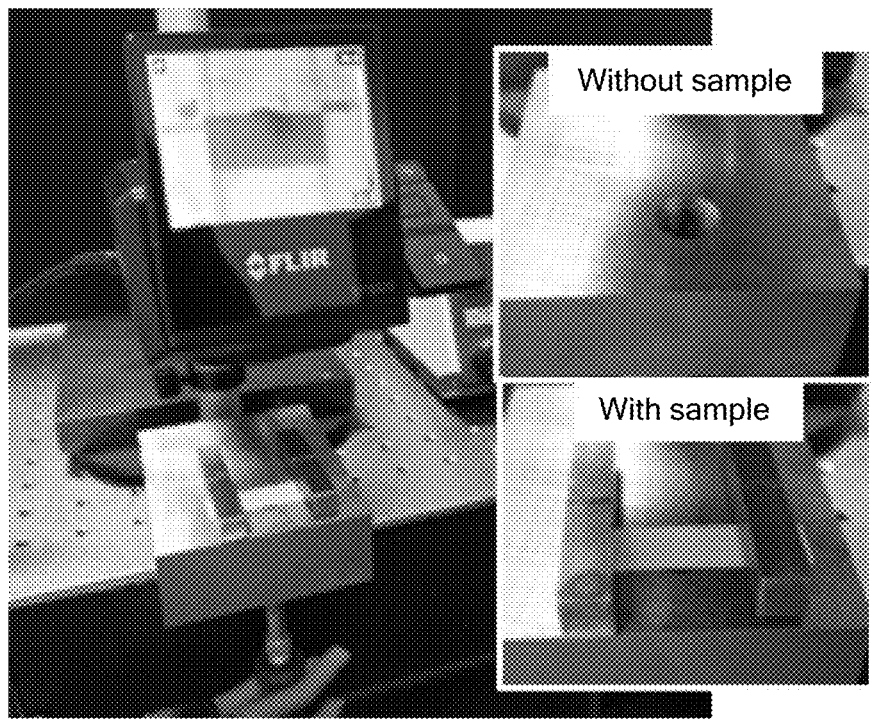
FIG. 2B shows a photograph of a thermal imaging setup.
Figure 2C:
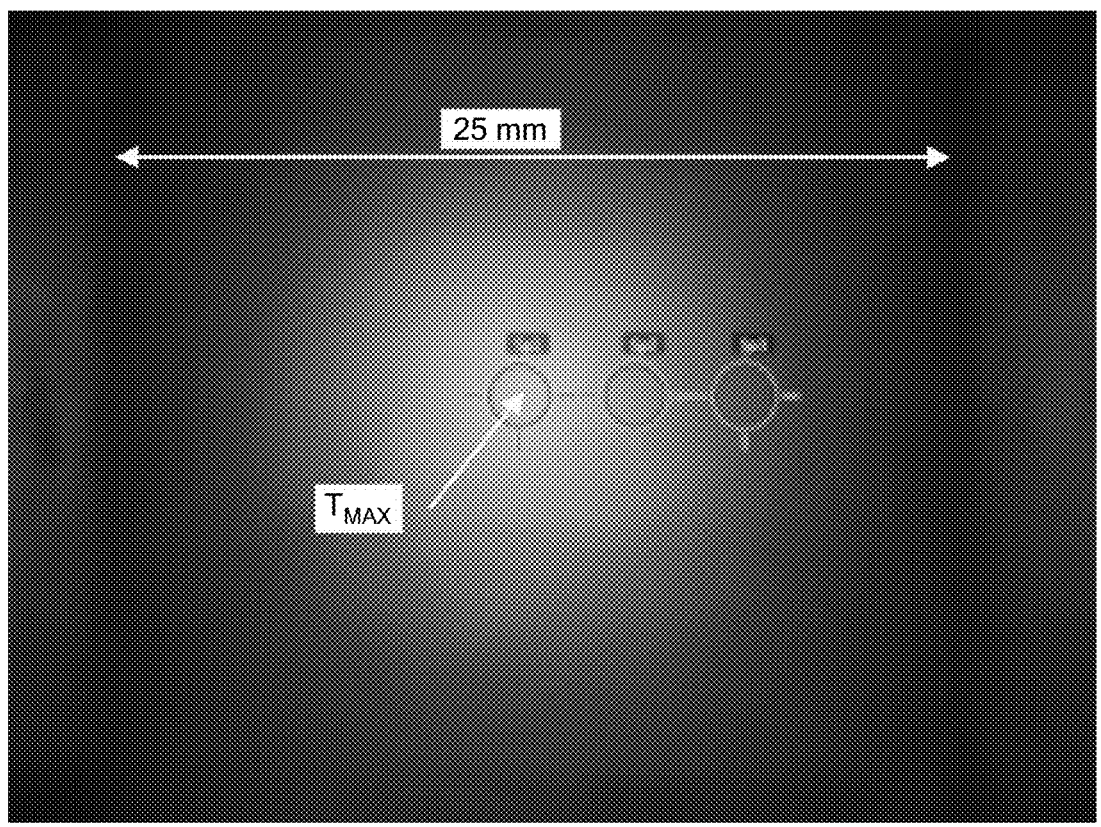
FIG. 2C shows an IR thermography image of thermal spreading on a sample of material coated with hBN.
Figure 4A:
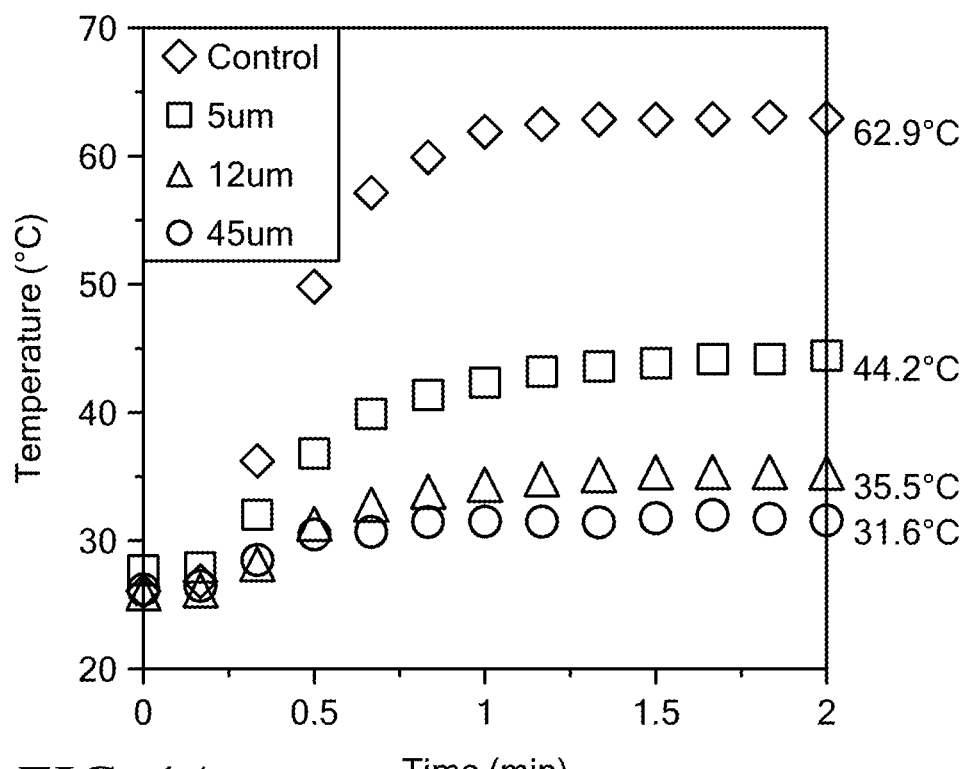
FIG. 4A shows heat dissipation as a function of hBN platelet size for cast-molded hBN thermal layers.

The microstructures of the monolayer and cast-molded films were characterized with optical microscopy and scanning electron microscopy (SEM). These imaging techniques allowed full characterization of the hBN alignment within the film and directly correlated with the thermal spreading ability. Thermal spreading was measured with a custom thermal heat stage and an infrared (IR) thermography camera, as shown in FIG. 2A and FIG. 2B. FIG. 2A shows a schematic diagram of the thermal imaging setup. FIG. 2B shows an image of the thermal imaging setup. The thermal setup includes a heated point source located under the sample with steel heat sinks located on each side. This allowed the thermal gradient to be captured via IR camera located above the sample. Samples were placed with the hBN layer facing the heat source and thermal images captured through the fiberglass layer, as shown in FIG. 2C. The thermal spreading capability of each sample was tested by heating the sample for 2 minutes and observing the increase in the maximum temperature, $T_{MAX}$. The $T_{MAX}$ shows the temperature measurement location for thermal spreading tests. The thermal spreading abilities of all samples were tested using the custom thermal imaging set-up as discussed above. For example, the maximum temperature of the FG was measured and compared for both the hBN cast-molded and monolayer films after reaching their steady state temperature. In addition, variation of maximum temperature with particle size was used to determine the best platelet size for thermal spreading. For the cast-molded hBN layers, the 45 µm platelets showed the best thermal spreading of all particle sizes, as shown in FIG. 4A. Compared to the control FG-epoxy sample without hBN platelets (control), the 45 µm hBN cast-molded layer reduced the overall temperature by over 30 degrees, effectively reducing the hot spot to room temperature (FIG. 4A). The 5 µm and 12 µm platelets and also showed good thermal spreading, though less noticeable compared to the larger platelets due to the lower through-plane thermal conductivity of smaller platelets.

Figure 4B:
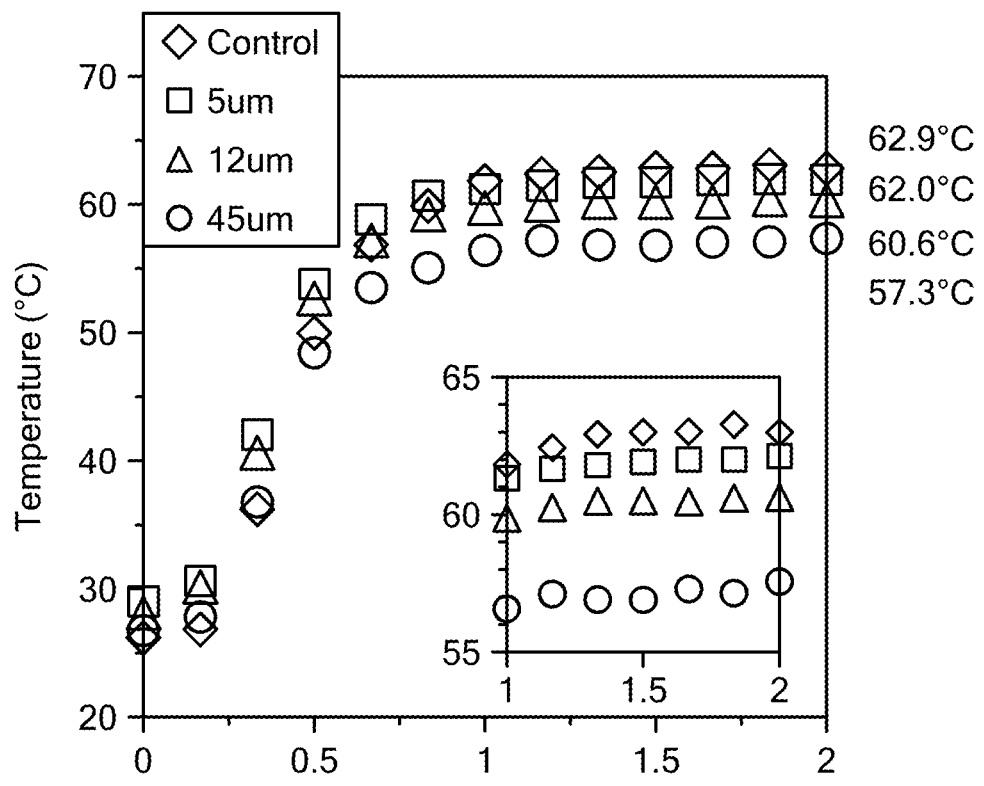
FIG. 4B shows heat dissipation as a function of hBN platelet size for hBN monolayer films.

Particle size was also compared in the hBN monolayer films for a single layer, as results for a single layer are shown in FIG. 4B. Thermal spreading results showed similar trends to the hBN cast-molded films (FIG. 4A) with the 45 µm platelets having the largest reduction in temperature. The overall temperature reduction was smaller than with the thicker cast-mold films, likely due to the smaller amount of hBN platelets available for thermal transport. However, the results showed an excellent thermal conductivity increase for a negligible overall film-thickness increase.

Figure 4C:
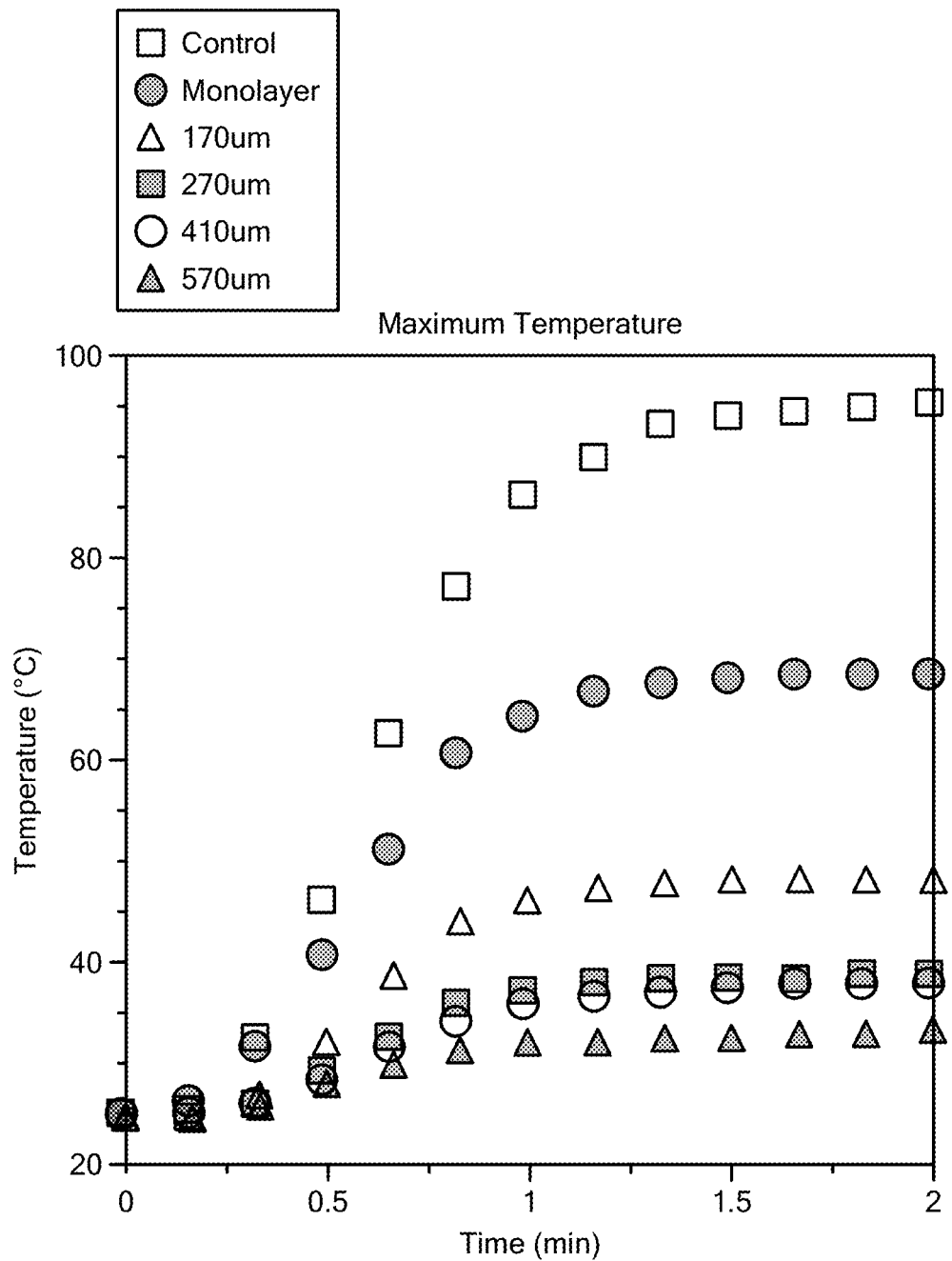
FIG. 4C shows heat dissipation as a function of layer thickness for hBN cast mold and monolayer samples made from 45 μm platelets.

The 45 µm platelets were used to create BN monolayers and an array of cast-molded hBN-fiberglass composite thicknesses, as shown in FIG. 4C. The thicknesses of the cast-molded films were tailored from 170 µm to 570 µm, to correlate film thickness with thermal spreading ability. This allowed the desired thermal spreading to be tailored to the specific application and expected environment of the material. In addition, the overall temperature of the test was increased to incorporate higher temperature applications and compare the results to initial studies. As can be seen on the Y-axis of FIG. 4C, the control temperature increased compared to FIG. 4A and FIG. 4B. Results showed that as the thickness of the hBN cast-molded samples was increased, thermal spreading was increased. For the case of the thickest 570 µm cast-molded sample, the reduction in maximum temperature was consistent with the previous study and reduced the hot spot by over 50° C., as can be seen in FIG. 4C.

Figure 3A:
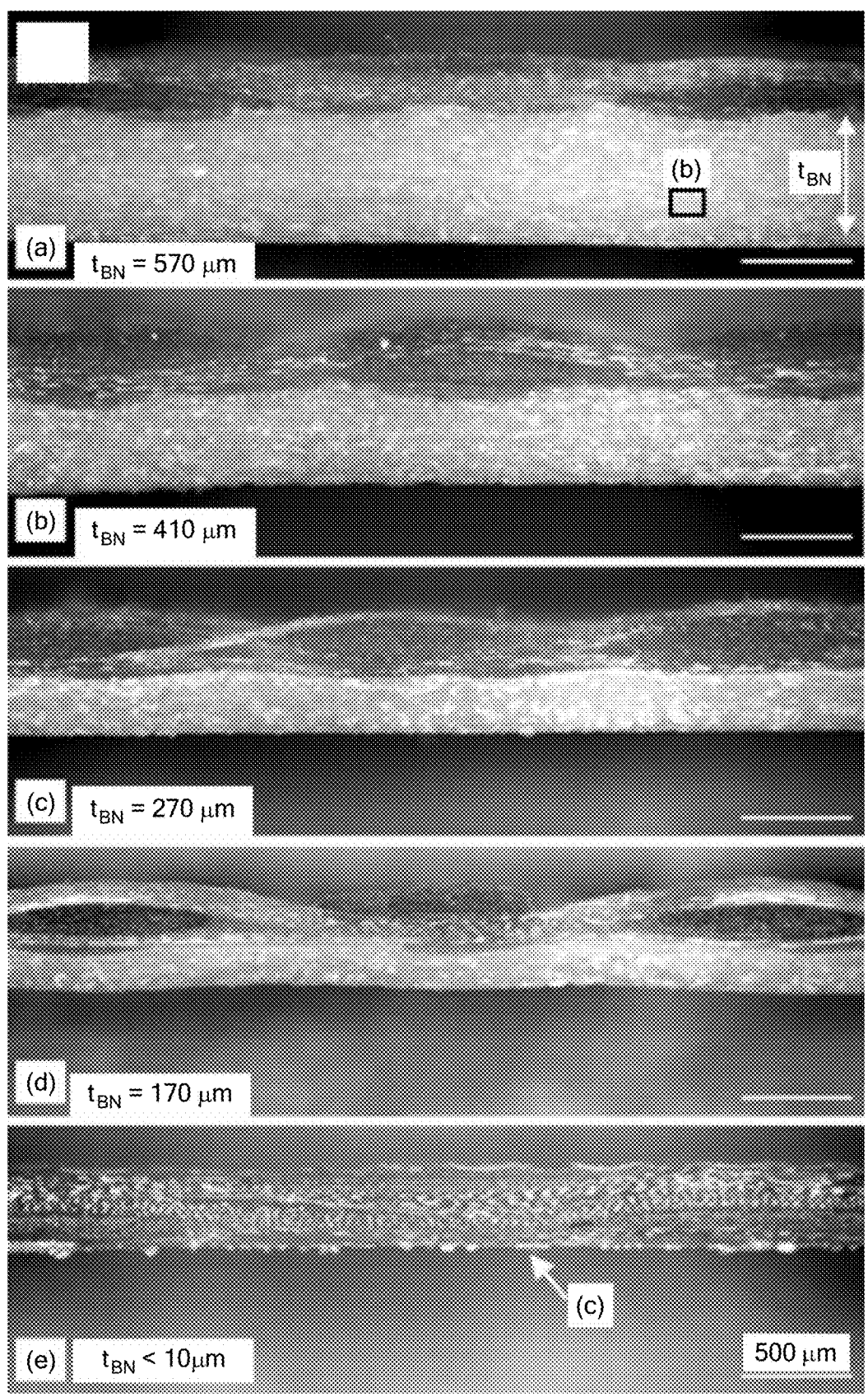
FIG. 3A shows light microscopy images of hBN-fiberglass-epoxy composite cross sections showing a range of thicknesses for the cast molded hBN-epoxy films and hBN monolayer samples and sample uniformity.
Figure 3B:
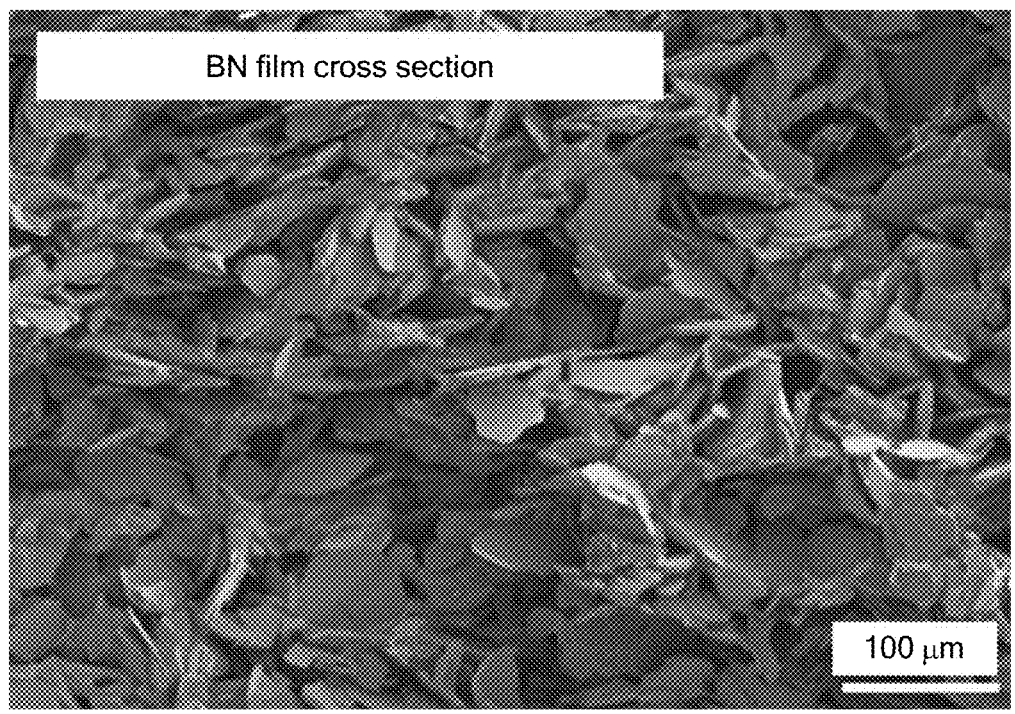
FIG. 3B shows a scanning electron micrograph of the 60 v % hBN-epoxy cast-molded film (cross section) showing good percolation and density of the cross section.
Figure 3C:
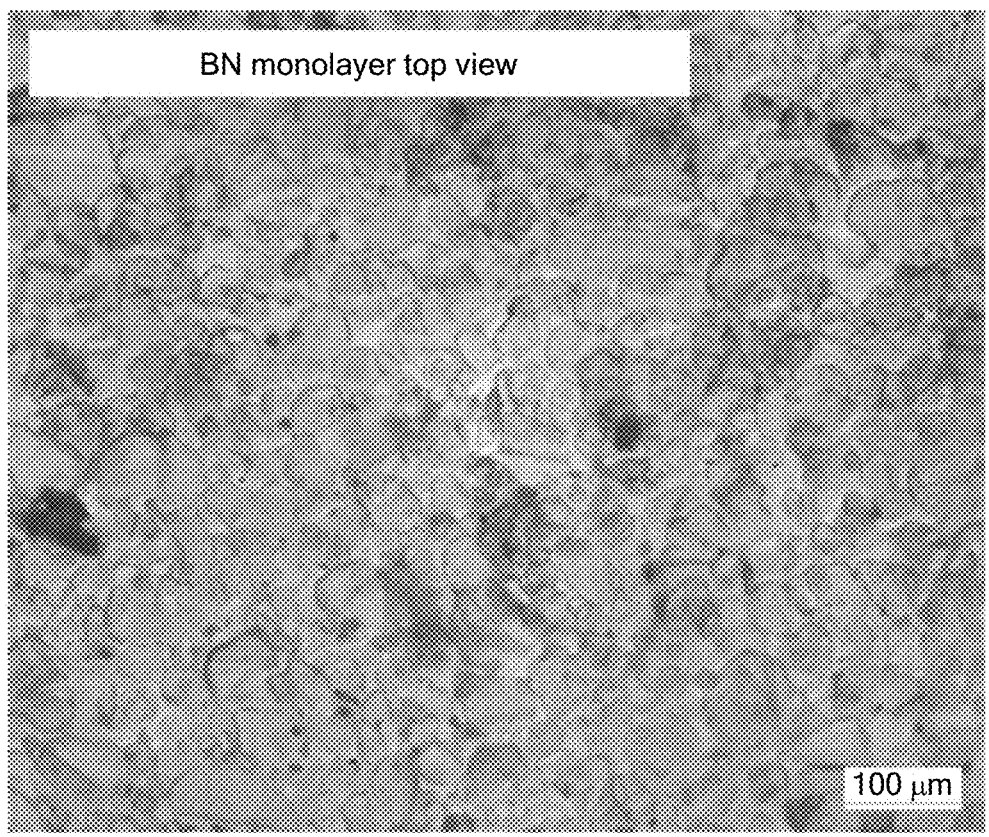
FIG. 3C shows a light micrograph of a hBN monolayer on the surface of fiberglass-epoxy sample.

FIG. 3A shows optical microscopy images of hBN-fiberglass-epoxy composite cross sections showing a range of thicknesses for the cast molded hBN-epoxy films, with thickness indicated as "$t_{BN}$", and hBN monolayer samples indicated by "(c)", and sample uniformity. FIG. 3B shows a scanning electron micrograph of the 60 v % hBN-epoxy cast-molded film showing good percolation and density of the cross section. FIG. 3C shows an optical microscopy image of the hBN monolayer on the surface of fiberglass-epoxy sample.

Optical microscopy images of cast-molded hBN films showed excellent uniformity and density of the hBN thermal layer that easily contoured to the rough surface of the FG layer. The incorporation of epoxy binder or adhesive allowed good adhesion to the FG as well as adding mechanical stability to the hBN particles. Ideally, the hBN platelets create a percolated network to allow thermal transport through the high conductivity basal plane. The 60 v % hBN-epoxy films show good adhesion to the FG and percolation within the hBN film as shown in FIG. 3A and FIG. 3B. Optical microscopy of FG samples created with a hBN monolayer are shown in FIG. 3C. Similar to the hBN cast-molded samples, hBN platelets showed excellent percolation and high alignment across the surface of the fiberglass layer. In addition, the 2 ounce/10 ounce FG layering technique coupled with the vacuum molding process removed all bubbles and discontinuities within the sample, as shown in FIG. 3A.

Example 4

Fabrication and Testing of Durable Superhydrophobic Layers

In this example, System 2000 epoxy (FIG. 7A) was used with woven 10 ounce and 2 ounce FG cloths (FIG. 7B). Fiber fabric with z-aligned milled fibers (FIG. 8A, FIG. 8B, SuperComp, Boston Materials, LLC) was used for testing microstructure and processing. FIG. 8A shows an SEM image of the Boston Materials SuperComp cross-section showing the x-y fiber weave and the z-aligned fibers above. The traditional hand lay-up method was used to fill the fiber (FG) weaves with epoxy before adding on the z-axis aligned layer. The back of the weave (opposite the loose fibers) was lightly coated with a thin layer of epoxy and the substrate (either a weave or a solid substrate) was coated with a surface layer of epoxy, then the vacuum molding process was performed with the z-aligned fibers facing the base plate. This choice was to ensure that the epoxy pulled through the weave and into the z-aligned network, securing it in place. FIG. 8C shows an SEM cross section of SuperComp with partial epoxy impregnation into the z-aligned fibers with inset (right).

Contact angle measurements showed improvement in the hydrophobicity with SuperComp compared to traditional fiber weaves and bare epoxy. Wear testing results indicated that the epoxy matrix made the system more durable and consistent. Tested SuperComp composites were created from a plain-weave fabric with short ~150 µm long fibers aligned perpendicular to the fabric in the z-direction, as shown in the SEM image in FIG. 8A.

The observed microstructure promotes good impact resistance due to loads applied to the long axis of the fibers as well as the desired surface roughness for superhydrophobic properties. The superhydrophobic samples were received as a dry fabric with no binder or filler allowing a high degree of freedom over the processing and impregnation with the epoxy binder. As received sample is shown in FIG. 8B (left). FIG. 8B shows an SEM image of SuperComp without epoxy impregnation and inset (right) showing hydrophobic PTFE coating. Prior to the addition of the epoxy binder, samples were sprayed with a thin coating of polytetrafluoroethylene (PTFE) to improve the hydrophobicity as shown in FIG. 8B (right). The coating of PTFE improved the hydrophobicity of the dry SuperComp fabric prior to introducing the epoxy binder. In general, the alignment of the dry SuperComp fabric was excellent and provided a well textured framework to create a superhydrophobic surface. By purposefully starving the SuperComp of epoxy resin, it can be seen in FIG. 8C that the epoxy matrix impregnated approximately half of the milled fibers leaving the other half exposed outside of the matrix. Pristine samples showed a steady upward trend in the contact angle, starting at 86.4° for bare epoxy up to 151.8° for SuperComp as shown in FIG. 9 (left). Even after extreme sandblasting, the contact angle stayed hydrophobic, dropping down to 117.4° as shown in FIG. 9 (right).

As used herein, "consisting essentially of" allows the inclusion of materials or steps that do not materially affect the basic and novel characteristics of the claim. Any recitation herein of the term "comprising", particularly in a description of components of a composition or in a description of elements of a device, can be exchanged with the alternative expressions "consisting essentially of" or "consisting of".

What is claimed is:

1. A layered composite material comprising:
   i) a hexagonal boron nitride thermally conducting layer disposed at a first surface of the composite material;
   ii) an optional core layer;
   ii) a fiber reinforced layer; and
   iv) a superhydrophobic surface layer disposed at a second surface of the composite material, opposite the first surface;
   wherein the superhydrophobic layer is formed from a fiber fabric comprising a woven fiber layer and a layer of z-aligned milled fibers extending across the woven fiber layer,
   the layer of z-aligned milled fibers comprising a densely-packed, continuous array of z-aligned, milled carbon fibers that are situated substantially parallel to each other and substantially perpendicular to the woven fiber layer;
   wherein the fiber fabric is impregnated with an adhesive such that the z-aligned milled fibers are partially embedded in the adhesive;
   and wherein the z-aligned milled fibers are coated with polytetrafluoroethylene and exposed at the second surface.

2. The layered composite material of claim 1, comprising said core layer, wherein the core layer comprises air, a foam, a honeycomb, a ferrite material, a magneto-ceramic material, a metal, a polymeric material, a fibrous material, or a combination thereof.

3. The layered composite material of claim 2, wherein the core layer comprises polystyrene, polyethylene, PVC foam, polyurethane foam, polycarbonate honeycomb, honeycomb paper, synthetic fiber, wood, carbon fiber, or a combination thereof.

4. The layered composite material of claim 1, wherein the fiber reinforced layer comprises a synthetic fiber, glass fiber, quartz fiber, carbon fiber, or a combination thereof.

5. The layered composite material of claim 1, wherein the boron nitride layer comprises or consists of one or more layers of hexagonal boron nitride platelets.

6. The layered composite material of claim 1, wherein the fiber reinforced layer comprises one or more woven glass fiber fabrics embedded in a binder.

7. The layered composite material of claim 6, wherein the binder is an epoxy.

8. The layered composite material of claim 1, comprising a hexaferrite core and fiberglass layers bound to opposite surfaces of the hexaferrite core, wherein the hexagonal boron nitride layer is bound to one of said fiberglass layers.

9. The layered composite material of claim 1, wherein the material is configured as a radome, a radio frequency filter, a covering for an electronic component or device, or a portion thereof.

10. A product comprising the layered composite material of claim 1.

11. The product of claim 10, wherein the product is selected from the group consisting of a radome, a nosecone, a circuit board shield, a heat shield for an electronic device, a battery package, an aerodynamic heat shield, a satellite heat shield, a cellular network antenna heat shield, an engine heat shield, an exhaust heat shield, a band-pass filter, a CPU or GPU heatsink, a building material, and a thermal soak heat shield.

12. The layered composite material of claim 1, wherein the adhesive comprises an epoxy resin, a cyanate resin, a polyester resin, a polyimide resin, an organic silicone resin, a polytetrafluoroethylene resin, a cyanoacrylate, a bimaleimide resin, a polyether ether ketone resin, a phenolic resin, a polyethylene resin, or any combination thereof.

* * * * *